(12) United States Patent
Klug

(10) Patent No.: US 7,085,745 B2
(45) Date of Patent: Aug. 1, 2006

(54) METHOD AND APPARATUS FOR IDENTIFYING, MANAGING, AND CONTROLLING COMMUNICATIONS

(76) Inventor: John R. Klug, 5801 Bluebell La., Evergreen, CO (US) 80439

( * ) Notice: Subject to any disclaimer, the term of this patent is extended or adjusted under 35 U.S.C. 154(b) by 0 days.

(21) Appl. No.: 10/673,107

(22) Filed: Sep. 27, 2003

(65) Prior Publication Data

US 2004/0177048 A1   Sep. 9, 2004

Related U.S. Application Data

(60) Provisional application No. 60/452,369, filed on Mar. 5, 2003.

(51) Int. Cl.
*G06Q 10/00* (2006.01)
(52) U.S. Cl. .................................... 705/401
(58) Field of Classification Search ............... 705/400, 705/401, 404; 709/206, 207
See application file for complete search history.

(56) References Cited

U.S. PATENT DOCUMENTS

| | | | | |
|---|---|---|---|---|
| 3,848,233 | A * | 11/1974 | Lotan et al. ................. | 710/305 |
| 5,508,817 | A * | 4/1996 | Kunigami ................... | 358/402 |
| 5,627,764 | A * | 5/1997 | Schutzman et al. ......... | 709/207 |
| 5,694,322 | A * | 12/1997 | Westerlage et al. ......... | 705/417 |
| 5,771,289 | A * | 6/1998 | Kuzma ........................ | 713/153 |
| 5,822,738 | A * | 10/1998 | Shah et al. .................. | 705/410 |
| 5,822,739 | A * | 10/1998 | Kara ........................... | 705/410 |
| 5,956,721 | A * | 9/1999 | Douceur et al. ............. | 707/10 |
| 5,970,481 | A * | 10/1999 | Westerlage et al. ......... | 705/417 |
| 5,999,967 | A * | 12/1999 | Sundsted .................... | 709/206 |
| 6,005,945 | A * | 12/1999 | Whitehouse ................. | 380/51 |
| 6,047,272 | A * | 4/2000 | Biliris et al. ................. | 705/400 |
| 6,141,654 | A * | 10/2000 | Heiden et al. ............... | 705/408 |
| 6,175,621 | B1 * | 1/2001 | Begeja .................... | 379/208.01 |
| 6,192,114 | B1 | 2/2001 | Council ....................... | 379/114 |
| 6,199,054 | B1 * | 3/2001 | Khan et al. .................. | 705/400 |
| 6,240,402 | B1 * | 5/2001 | Lynch-Aird ................. | 705/400 |
| 6,351,764 | B1 * | 2/2002 | Voticky et al. .............. | 709/207 |
| 6,412,006 | B1 * | 6/2002 | Naudus ....................... | 709/227 |
| 6,587,550 | B1 | 7/2003 | Council et al. ......... | 379/100.08 |
| 6,619,544 | B1 * | 9/2003 | Bator et al. .................. | 235/381 |

(Continued)

FOREIGN PATENT DOCUMENTS

WO    WO 00/79455 A1 * 12/2000

OTHER PUBLICATIONS

Hall: "How to avoid unwanted email", Communications of the ACM, Mar. 1998, vol. 41, No. 3, pp: 88-95.*

(Continued)

*Primary Examiner*—Thomas A. Dixon
(74) *Attorney, Agent, or Firm*—Dorsey & Whitney LLP

(57) ABSTRACT

A method and apparatus for sorting, prioritizing, identifying, managing, and otherwise controlling (collectively, "controlling") a communication. A frank may be used to associate a value and a class with a communication. The communication may be associated with the frank through the method of selecting a frank associated with a value from among a plurality of frank types, each of the frank types having a pre-assigned value, associating the frank with the communication, and initiating transmission of the franked communication across a network. Value may include anything important of having meaning to the parties, including, for example, money, credit (or a promise to pay), frequent flier miles, and so forth. "Franking" a communication generally associates some indicia of value and/or a service class with a communication.

15 Claims, 12 Drawing Sheets

U.S. PATENT DOCUMENTS

| | | | |
|---|---|---|---|
| 2002/0059138 A1* | 5/2002 | Priest et al. | 705/39 |
| 2002/0065897 A1 | 5/2002 | Voticky et al. | 709/207 |
| 2002/0120702 A1 | 8/2002 | Schlavone et al. | 709/207 |
| 2002/0120705 A1 | 8/2002 | Schlavone et al. | 709/207 |
| 2002/0194308 A1* | 12/2002 | Hall | 709/219 |
| 2002/0198850 A1* | 12/2002 | Grande et al. | 705/400 |
| 2003/0078893 A1* | 4/2003 | Shah et al. | 705/60 |
| 2003/0229672 A1 | 12/2003 | Kohn | 709/207 |
| 2004/0034694 A1 | 2/2004 | Brown et al. | 709/207 |

OTHER PUBLICATIONS

Author Unknown "Crack Down on Spam," Editorial from The New York Times, Apr. 29, 2003.

Author Unknown, "Spam FAQ," The Wall Street Journal, Jun. 19, 2002.

Beauprez, Jennifer, "High-tech war pits sleuth vs. spammer," Denver Post, Jan. 19, 2003.

Borland, John, "Web standards group to tackle spam," CNET News.com, May 9, 2003.

Bowman, Lisa M., "Congestion charge for spam?," CNET News.com, May 9, 2003.

Brøndmo, Hans Peter, Conference Roundtable Luncheon—Solving Spam by Introducing Sender Accountability, ISP-CON Convention, May 6, 2003.

France, Mike, "Needed Now: Laws to Can Spam," Business Week, Sep. 26, 2002.

Hansell, Saul, "Big Companies Add to Spam," The New York Times, Oct. 28, 2003.

Jesdanun, Anick, "Anti-Spam Program Raises Backfire Fears,", InformationWeek, Jun. 5, 2003.

Jesdanun, Anick, "Earthlink software challenges spammers to prove they're human; critics say it's a 'knee-jerk response' that threatens e-mail itself," Rocky Mountain News, Jun. 9, 2003.

Kandra, Anne, "Consumer Watch: Are You Helping a Spammer?," PC World Magazine, Sep. 2003.

Kontzer, Tony, "New Spam Fighter Uses Controversial Technique," InformationWeek, Jun. 10, 2003.

Kraut, Robert E., et al., "Markets for Attention: Will Postage for Email Help?", CSCW'02, Nov. 16-20, 2002, New Orleans, Louisiana, USA, Copyright 2002 ACM 1-58113-560- Feb. 2, 2001, pp. 206-215.

U.S. Appl. No. 09/683,315, filed Dec. 13, 2001, Voticky et al.

U.S. Appl. No. 09/792,936, filed Feb. 26, 2002, Schlavone et al.

U.S. Appl. No. 10/084,038, filed Feb. 26, 2002, Schlavone et al.

U.S. Appl. No. 10/163,842, filed Jun. 05, 2002, Kohn.

U.S. Appl. No. 10/219,629, filed Aug. 15, 2002, Brown et al.

Lee, Jennifer, "Spam: An Escalating Attack of the Clones," The New York Times, Jun. 27, 2002.

Mangalindan, Mylene, "Start-Ups Work to Curb Spam—and Turn a Profit," The Wall Street Journal, Jun. 19, 2002.

Mangalindan, Mylene, "Multiplying Spam Spurs New Legislative Efforts," The Wall Street Journal, Jun. 19, 2002.

Mangalindan, Mylene, "For Bulk E-Mailer, Pestering Millions Offers Path to Profit,"The Wall Street Journal, Nov. 13, 2002.

Manktelow, Nicole, "Spicing up spam," smh.com.au, Apr. 11, 2003.

Metz, Cade, "Slam the Spam," PC Magazine, Feb. 25, 2003.

Metz, Cade and Larry J. Seltzer, "More Ways to Slam the Spam," PC Magazine, May 27, 2003.

Mossberg, Walter S., "ChoiceMail Designs Best Traffic Cop Yet to Thwart Spammers," Personal Technology, The Wall Street Journal, Jul. 11, 2002.

Mossberg, Walter S., "Sprint's Speedy Treo Has Better E-Mailimg and More Battery Life," Personal Technology, The Wall Street Journal, Sep. 19, 2002.

Mossberg, Walter S., "Matador Combines 3 Tools To Keep Your Spam at Bay," Personal Technology, The Wall Street Journal, Nov. 21, 2002.

Robbins, Alexandra, "You Spam, You Pay," PC Magazine, Apr. 30, 2003.

Sandberg, Jared, "To List of Annoyances Add Office E-Mails: Enlargement Anyone?," Cubicle Culture, The Wall Street Journal, Feb. 19, 2003.

Spector, Lincoln, "Could You Be Sending Spam?," PC World.com, May 30, 2003.

Spring, Tom, "Spam Slayer: Beware Spam's Siblings," PC World.com, Nov. 3, 2003.

Swartz, Jon, "Spam tussle spreads to cell phones," USA Today, Jun. 16, 2003.

Swibel, Matthew, "Pay Up!," Forbes.com, Jul. 7, 2003.

Wagner, Mitch, "How Spammers Will Beat Challenge-Response Systems, And Other Conversations About Spam (Wagner's Weblog)," Internetweek.com, Jun. 13, 2003.

Waldman, Steven, "From Soccer Moms to Spam Dads," slate.msn.com, May 22, 2003.

* cited by examiner

METHOD AND APPARATUS FOR IDENTIFYING, MANAGING, AND CONTROLLING COMMUNICATIONS

CROSS-REFERENCE TO RELATED APPLICATIONS

This application claims priority to U.S. Provisional No. 60/452,369, entitled "METHOD AND APPARATUS FOR IDENTIFYING, MANAGING, AND CONTROLLING COMMUNICATIONS," naming John R. Klug as Inventor and filed on Mar. 5, 2003, the entirety of which is hereby incorporated by reference. This application is also related to co-pending application Ser. No. 10/673,073, also entitled "METHOD AND APPARATUS FOR IDENTIFYING, MANAGING, AND CONTROLLING COMMUNICATIONS," naming John R. Klug as Inventor and filed on Sep. 27, 2003, the entirety of which is also incorporated herein by reference.

BACKGROUND OF THE INVENTION

1. Technical Field

The inventive field relates to the field of information interchange between two or more users of computing and/or telecommunications devices. More specifically, at least one embodiment of the present invention relates to the inventive field of electronic communications, one type of such communications being commonly referred to as e-mail communications, and to apparatuses and/or processes for categorizing, identifying, communicating, routing, prioritizing, and/or discouraging unwanted communications.

2. Background Art

Commonly today, users of computing and/or telecommunications devices often receive untold numbers of communications from various persons, entities and/or automated systems. Many of such communications are unwanted and are often considered undesirable by recipients and others for various reasons. In addition, users of commercially provided, corporate provided and/or individually provided electronic mail ("e-mail") accounts receive dozens, or even hundreds, of unwanted e-mail communications daily. Regardless of whether an e-mail account is provided by Microsoft (e.g. via their MSN and/or HOTMAIL services), Yahoo (e.g. via its web-based e-mail services), or via various corporate e-mail services and/or applications (for example, via a Microsoft Exchange Server connected to a desktop and/or other computing device on which an e-mail application, such as Microsoft OUTLOOK, and/or other desktop applications may be running), e-mail communication users (and user of other forms of communications) are subjected daily to numerous unwanted e-mails/communications. These unwanted e-mails/communications are often commercial solicitations in which the recipient has little if any interest, and are commonly referred to as "spam," "mass e-mails," or the like. Today, spam makes up a significant percentage of all e-mail traffic. The amount of spam e-mail users receive today has led many users to simply stop using e-mail as a communications medium.

Similarly, users and facilitators of instant messaging services ("IM"), short messaging services or protocols ("SMS/SMP"), voice mails, voice communications and telemarketing calls, faxes and other forms of printed communications, video communications (for example, those some day available over digital television mediums such as high definition television and/or digital cable/satellite systems), graphical communications (e.g., pop-up advertisements) and other communication mediums are also often inundated with unwanted communications. The continual inundation of recipients with unwanted communications have led to the widespread adoption of various systems and devices, such as caller identification systems, e-mail filters, no-call lists and others, which are utilized to minimize, reduce and/or prevent such intrusions. Thus, the very aspects of e-mails other forms of electronic communications which make such mediums appealing are quickly becoming nuisances.

For many forms of communications, simple technical or regulatory solutions to minimizing such nuisances may not be readily available. For example, with regards to e-mail and in particular spam, one of the essential characteristics of spam, which makes it so widespread and pervasive, derives from the very nature of the communications medium it is utilizing. As anyone who has ever "surfed" the Internet or sent an e-mail commonly appreciates, the costs in equipment and services needed to send an e-mail are quite minimal.

Further, minimal system resources and a valid electronic address are commonly all that is needed to effectively communicate spam to a recipient. A spammer (that is, one who sends or distributes spam) generally need not sort the spam by geographical region, zip codes, area codes or otherwise. Instead, the Internet itself provides the routing and "sorting" necessary to communicate e-mails/communications to multiple recipients, wherever they may be in the world. Additionally, since many recipients prefer to use e-mail/communication addresses that are easy for others (such as their business contacts and friends) to remember, often e-mail/communication addresses are quite predictable and, hence, valid electronic addresses are easily obtainable.

Thus, it is to be appreciated that there is a tremendous need for systems and processes which ease the burden upon Internet service providers ("ISPs"), recipients, and others in identifying, controlling, disseminating and/or receiving communications in general and e-mail communications and/or other types of electronic communications and spam in particular.

SUMMARY OF THE INVENTION

Generally, one embodiment of the invention comprises a method for franking a communication. Generally, the method comprises selecting a frank associated with a value from among a plurality of frank types, each of the frank types having a pre-assigned value, associating the frank with the communication, and initiating transmission of the franked communication across a network. Value may include anything important of having meaning to the parties, including, for example, money, credit (or a promise to pay), frequent flier miles, and so forth. "Franking" a communication generally associates some indicia of value and/or a service class with a communication.

Franked communications may be sent by a sender and received by a recipient. Generally, such franked communications may be received and processed by determining whether the communication includes a frank corresponding to a value, in response to determining the communication does not include a frank, processing the communication according to at least one default rule, otherwise determining a service class to which the frank corresponds, and in response to determining the service class to which the frank corresponds, processing the communication according to at least one service class-based rule.

Franks are generally generated by an apparatus. One exemplary apparatus for generating a frank may include a franking request receipt module, operative to receive a request for at least one frank, a franking generation module operative to generate a frank in response to the request for at least one frank and operatively connected to the franking request receipt module, and a frank transmission module operative to transmit a generated frank, the frank transmission module operatively connected to the franking generation module.

Another apparatus may generate and send a franked communication. Such an apparatus may include a frank request module operative to request a frank, a frank attachment module operative to attach the frank requested by the frank request module to a communication, thereby creating a franked communication, and a franked communication transmission module operative to transmit the franked communication.

Yet another apparatus may receive and process a franked communication. Such an apparatus may include a communication receipt module operative to receive a communication, a determination module operative to determine whether the communication is franked, the determination module operatively connected to the communication receipt module, and a franked communication processing module operative to process the communication according to a first rule in the event the communication is franked, the franked communication processing module operatively connected to the determination module.

DETAILED DESCRIPTION OF THE INVENTION

1. Overview

Figure 1:
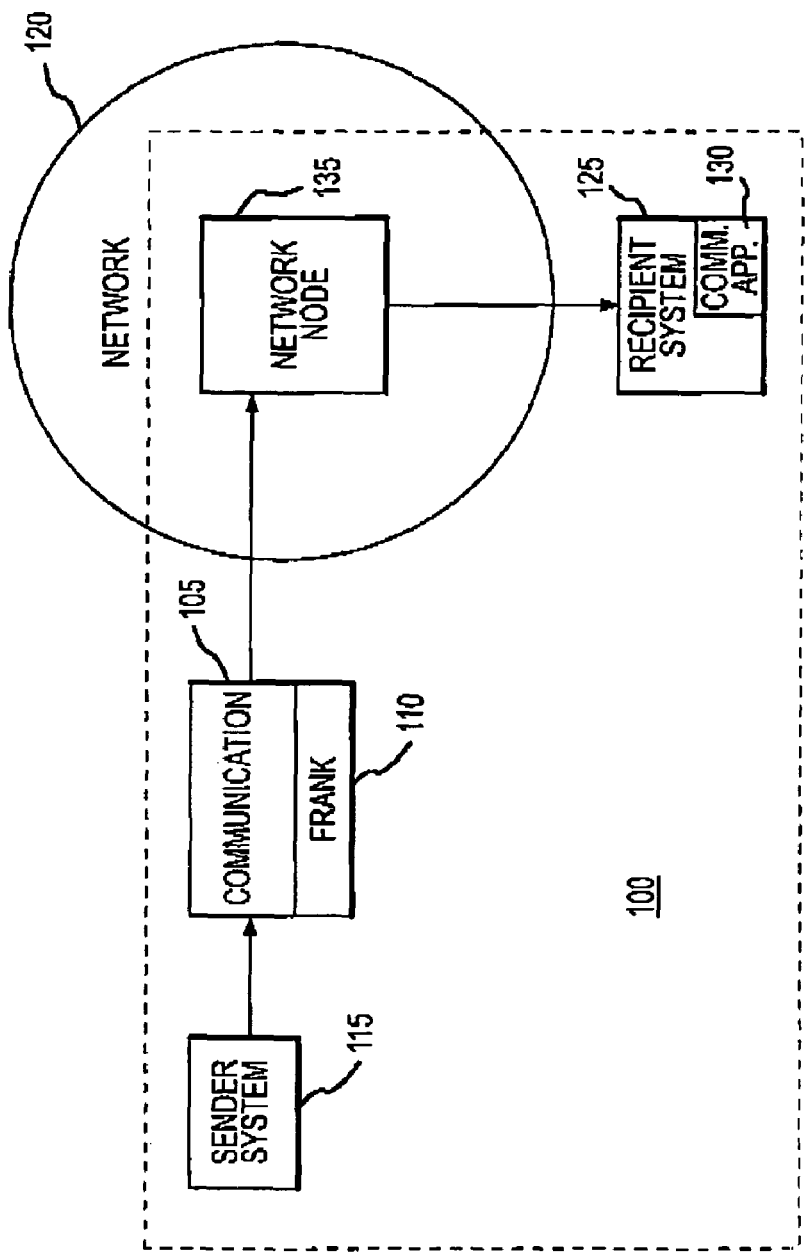
FIG. 1 displays a general embodiment of the present invention.

Generally, the various embodiments of the present invention implement one or more methods and/or systems of controlling, identifying, disseminating, and, in some cases, eliminating communications categorized into various classifications or other indications of priority, type of content, status, origin or the like. As mentioned previously above, examples of communications include, but are not limited to: e-mail messages; IMs; SMSs; sequence packet protocols ("SPPs"); voice mail communications, including, for example, telemarketing communications; video communications; audio communications; voice communications; information provided in video, graphical, still picture, text or other formats; electronic mail attachments; and any other information or computer readable elements capable of transmission across a network. It should be understood that the terms "e-mail," "electronic mail," "electronic messages," "messages" and/or "communication(s)" may be used interchangeably throughout this document, and the use of one such term may be construed to cover the usage of any such terms, unless such an interpretation is inconsistent with the manner in which a system and/or process feature or function is described.

More specifically, at least one embodiment of the present invention provides a system and/or process enabling a sender of an e-mail/communication (or another form of electronic communications) to categorize, prioritize, or otherwise handle such a e-mail/communication. This categorization may take place by attaching or otherwise associating an electronic frank or other categorizing element to the e-mail/communication. The frank(s) may be purchased or otherwise acquired, for example, from a franking server, a franking kiosk (whether stand-alone, integrated into automated teller machines or on-line) or other network entity configured to distribute franks and/or associate a frank with a given communication.

A frank may be obtained for a "fee" or some other value (such as money, time, and so forth), wherein the value may be specified or negotiated by the interested parties. Franks may also be provided for "free," as part of a subscription to a service (for example, subscription to an ISP or a given telecommunications service provider), or otherwise. Various embodiments for associating franks with e-mails/communications are discussed hereinbelow. However, other embodiments may also be utilized in conjunction with the present invention.

Further, the frank facilitates the recognition, filtering, sorting, classification, prioritization, timing, transmission, routing and/or identification of a given e-mail/communication or e-mails/communications. Generally, the frank may include a communication handling instruction, and instructs or otherwise facilitates the above operations via the instruction. Multiple classes of franks may be employed, each corresponding to a different e-mail/communication classification, type and/or service. For example, one frank might designate a "first class" e-mail/communication, a second might indicate a "third class" e-mail/communication, a third might indicate a "certified" e-mail/communication and yet a fourth might indicate a "first class" voice communication. Typically, franks representing higher categories (that is, "first class" instead of "third class") or enhanced services (such as e-mail/communication certification) cost more than franks representing lower categories or devoid of such services. By incorporating or associating a frank in/with an e-mail/communication, the sender may categorize the e-mail/communication as he desires.

Using a system consistent with one of the various embodiments of the present invention, ISPs, routers and other network nodes may be configured to expedite communications with a higher category while granting lower deliver priority to those of a lower category. For example, just as the United States Postal Service may transport bulk mail more slowly than Express or first class mail, the Internet, ISPs, network service providers and others may be configured to permit the delay of processing, routing and/or communication of e-mails/communications which have a bulk-class frank attached while other higher class e-mails/communications are handled or expedited. As a further example, an embodiment may delay (or permit the delay of) lower category e-mails/communications when the delivery of higher category e-mails/communications is pending. As yet another example, an embodiment may implement a time delay corresponding to a franked e-mail's service class or priority; first class or high priority e-mails/communications may be immediately processed, second class or medium priority e-mails/communications delayed by a small period of time, such as one hour, and third class or low priority e-mails/communications delayed longer, such as one day. Additionally, unfranked e-mails/communications may be delayed further, or may be handled in a manner different than franked e-mails/communications of any kind. For example, a network node, a recipient's application program, or other element involved in the transfer of a given e-mail/communication may be configured to delete all unfranked e-mails/communications or e-mails/communications of a specified type of content, source, medium or otherwise, if desired. Alternately, unfranked communications may be presented separately, color-coded, placed at a specific point in a queue, communication list, or inbox, and so forth.

Additional embodiments of the present invention may be configured to implement filtering tools, as desired by a given network provider, recipient and/or other to sort and categorize e-mails/communications based upon the category assigned to such e-mails/communications by a sender or another. In one embodiment, e-mails/communications to which a sender attaches an "express" or "first class" frank may be listed at the top of a recipient's e-mail/communication queue. Alternately, such e-mails/communications may be forwarded to a recipient's mobile communications device (such as a handheld pager, wireless communications device, cell phone, personal data assistant ("PDA") and so forth), while lower priority franked e-mails/communications are not forwarded. Similarly, those e-mails/communications to which a sender attaches a "bulk" or "spam" frank may be suitably listed at the bottom of the queue. In another embodiment, such franked e-mails/communications may be redirected to a separate in-box specifically configured to receive, or hold, or possibly automatically eliminate mailings. In yet another embodiment, franked e-mails/communications may be routed to persistent devices and/or non-persistent devices, depending upon rules and/or preferences designated by a system, a recipient or others.

Thus, in general, the various system and process embodiments of the present invention provide for the classification of communications, for example, e-mails, and a corresponding routing, processing, prioritizing, eliminating, and/or reviewing of such communications by recipients and/or network providers.

In other embodiments of the present invention, systems and processes are provided for confirming the delivery of e-mails/communications and/or other forms of electronic communications over a network to a particular recipient. More specifically, various embodiments of the present invention also permit for the sending of "certified e-mails/communications," i.e., communications for which acknowledgment of receipt by the intended recipient may be obtained at the time of delivery. Since this feature may involve additional communications (such as the return of an electronic receipt to the sender), a value for such service may also be associated with a given e-mail/communication, thereby further providing a market and financial mechanism for encouraging the use of such services when appropriate.

Similarly, various system and process embodiments of the present invention may be configured to provide a tracking service for e-mails/communications. More specifically, the various system and process embodiments of the present invention may be configured to track an e-mail/communication as it is communicated over one or many communications network(s) to a designated recipient(s). Yet other embodiments may encrypt and securely transmit e-mails/communications.

In another embodiment of the present invention, a system and process is provided which enables a recipient to include one or more senders on an "approved list," thus permitting e-mails/communications from these senders to be treated as if franked or in some other manner, as determined by the recipient or others (such as system operators). For example, e-mails/communications from approved senders may be placed in a recipient's e-mail/communication queue as if franked, even if no frank is attached. Such e-mails/communications may then be accessed by the recipient when desired.

2. General Embodiment

Generally, one embodiment of the present invention (shown in FIG. 1) may take the form of a communication franking and payment system 100. One such exemplary communication 105 is electronic mail, or "e-mail." This embodiment 100 may be utilized to classify a variety of e-mails/communications 105, files or other computer-readable data structures into at least one of a variety of different service classes.

Throughout this application, the term "system" refers to any single device or collection of device(s) configured and/or configurable for generating, sending, receiving, or otherwise creating an e-mail/communication which may be transmitted or otherwise communicated by one or more sending devices (either singularly or in combination) across a network to one or more receiving devices. Examples of "devices" or "computers" embraced by the present invention include, but are not limited to, personal computers, mainframe computers, minicomputers, personal data assistants ("PDAs"), cell phones, Internet-enabled telephones, laptop computers, computer workstations, Web tablets, wireless devices, cellular or land-line telephones, software applications, routers, switches, hubs, bridges, servers, e-mail/communication servers, IM servers, databases or other storage medium, gateways, and any other available or to be available device(s) capable of creating, sending, receiving or otherwise facilitating communications, as set forth by the various embodiments of the present invention described herein. Further, the e-mails/communications may be transmitted or communicated across a variety of network or communication topologies including, but not limited to, packet switched networks (such as the Internet, intranets, extranets, Ethernets, local area networks (LANS), wide area networks (WANS), and the like), circuit switched networks ( such as the POTS and some cellular systems); combinations of packet and circuit switched networks and other communications topologies which are configured to facilitate the transmission of information from one or more senders to one or more recipients.

In one embodiment of the present invention, a franking system 100 may be utilized in order to purchase or acquire franks 110. Such franks 110 may be used to associate e-mails/communications 105 into one of several service classes. Franks 110 may also be used for other purposes, such as delivering e-mails/communications subject to security verification, tracking, and so forth. Each service class may be associated with a unique frank 110. Franks for different service classes may be configured to cost different amounts. For example, franks 110 may cost different amounts for each service class, or be valid at "off-peak" or "on-peak" times, or be designated for specific transmission media, be specified for e-mails/communications of a given size, of a given content (e.g., text, graphics, audio, video, still pictures or the like), of a given rating (e.g., "R" for movies and "AC" for adult content), and so forth.

A user may purchase franks 110 either singly or in bulk. A "user" of the present invention may be either a person, entity, system or device (some examples of which are set forth above) or combination thereof, including one to acquire franks as needed or necessary.

Once purchased, the frank 110 may be attached to, incorporated in, encrypted as a portion of, placed in a header of, or otherwise associated with an e-mail/communication 105. This association effectively designates or categorizes the e-mail/communication 105 as belonging to the service class (or classes) corresponding to the frank. A single frank 110 may correspond to multiple service categories. For example, a single frank 110 may designate an e-mail/communication 105 as belonging to both a "first class" and "certified" category. Similarly, multiple franks may be used with a single e-mail/communication, or for a group of e-mails/communications (as may occur when e-mails/communications are transmitted or franked in bulk). Communications 105 associated with a frank 110 are generally referred to as "franked" communications.

The franked e-mail/communication 105 may be transmitted from a sender system 115 across one or more networks 120. As used herein, the term "network" 120 may refer to the Internet, an intranet, an extranet, a cable network, a satellite network, a wireless network, a peer-to-peer network, a multicast network, a private network, a public network, virtual private network, a self-contained network, a land-line or wired network, an optical network, a broadcast network, a WAN, a wide-local area network, a LAN, a dial up connection, an Internet connection, a plain old telephone service (POTS) network, a connection between two or more devices using any of the forgoing singly or in combination, or any other network or communications medium which may be configured to facilitate the creation, sending, and/or receiving of e-mails/communications 105.

The franked e-mail/communication 105 is typically received by a recipient system 125 after passing through one or more network nodes 135, which may or may not be associated with the recipient system. For example, FIG. 1 displays a recipient mail server, which is associated with the recipient system. Other network nodes 135 (such as ISPs, sender mail servers, and so forth) may not be associated with the recipient system.

Upon receipt of the franked e-mail/communication, 105 the recipient system 125 may analyze the frank 110 and sort the communication accordingly. For example, the recipient system 125 may be an IBM/PC compatible computer which has an e-mail/communication application 130 resident thereon, such as OUTLOOK, manufactured by Microsoft Corporation of Redmond, Washington, or Eudora Mail, manufactured by Qualcomm Incorporated, of San Diego, Calif., or INSTANT MESSENGER, manufactured by America Online Corporation. The communication program 130 may also be a separate program (or portion of a larger program) configured to receive, acknowledge, and/or process a frank 110 or franked communication 105. Alternately, the recipient system 125 may be any form of device of computer described herein.

When the recipient system 125 receives an e-mail/communication 105, it may be configured to determine whether or not the e-mail/communication has been franked. If the e-mail/communication 105 is not franked, the recipient system 125 may process the e-mail/communication according to the default rules specified by the given e-mail/communication application 130, or otherwise specified by the user.

If, however, the e-mail/communication 105 is franked, the recipient system 125 may determine the service class to which the frank 110 corresponds. Continuing with the present example, franking classifications (such as first, second, or third class franks) may be recognized by the recipient system 125. Generally, the higher the service class of the frank 110, the higher the category of the e-mail/communication 105.

The recipient system 125 may also be configured to order, list, rank, identify, prioritize, or otherwise designate an e-mail/communication 105 with the then highest category, when compared, for example, to previously received e-mails/communications, at the top of a communication queue. Ideally, e-mails/communications 105 at the top of the queue are accessed by a recipient prior to other e-mails/communications lower in the queue. For at least one embodiment, the recipient system 125 places high category e-mails/communications 105 at the top of the recipient's inbox or other communication display medium (or bottom, depending on how the recipient has configured the inbox), so that lower category e-mails/communications are presented to a recipient after at least a portion of higher category e-mails/communications have been presented. Thus, e-mails/communications 105 associated with first class franks 110 may be presented prior to e-mails/communications associated with second class franks, which are in turn presented prior to third class franked e-mails. Further, unfranked e-mails/communications may be assigned a lowest category, or none.

It is to be appreciated that in mail-exchange server topologies, a recipient's system 125 or device (such as a personal computer) may include e-mail/communication software 130 that is configured to perform ranking and presentation, as appropriate, of franked communications 105. Similarly, in embodiments wherein a mail-exchange server 135 is not utilized or communications are not received via a local software application 130 and instead are received via a network or server based application (for example, from a communications feature provided by an ISP server or a remote computing application, such as that supported by Citrix Systems and other like systems), the filtering and ranking may occur at the service provider's (and/or a third party's) server or system instead of the recipient's system 125. The results of such filtering and ranking may be provided via HTML pages, XML pages, Flash implementations, Java implementations and/or any other types of information transfer formats supported by a given service provider and compatible with a recipient's given device(s). Commonly, but not necessarily, such information transfer may occur via Web browser compatible information formats, such as those supported by Microsoft INTERNET EXPLORER, Netscape NAVIGATOR and others.

Regardless of whether an embodiment is server-, network-, or recipient-centric (or a combination thereof), embodiments may motivate senders of e-mails/communications 105 to pay for a first class frank 110 when they desire their e-mails/communications be presented sooner (i.e., given a "high category") rather than later (i.e., given a "low category") to a recipient. Senders attaching less importance and/or urgency to their e-mails/communications 105 may pay for a second or third class frank 110 or a frank otherwise suitably classified, while senders desiring no particular importance and/or urgency to be attached to their e-mails/communications may pay for no frank at all.

In some embodiments, franks 110 may be purchased after use. For example, an ISP might permit a purchaser to request and employ as many franks as desired, then pay for all franks as a surcharge or item on a monthly bill.

The various embodiments of the present invention may also be used to control mass e-mails/communications 105. First, by associating a frank 110 with an e-mail/communication 105, senders and recipients may designate and/or filter important e-mails/communications (that is, e-mails/communications for which the sender is willing to pay some premium in return for franking the e-mail/communication) from less important (or lesser franked, if at all) e-mails/communications. Generally speaking, a recipient may presume an e-mail/communication 105 for which a sender is willing to assign a frank to have delivered is more interesting, important, or urgent than an unfranked or lower category franked e-mail/communication.

In particular, by appropriately configuring or creating a filter (such as one of the type commonly available on, compatible with, or supported by most e-mail/communication application programs), franked e-mails/communications 105 may be delivered to a recipient's system 125 in order of category or service class, while unfranked e-mails/communications may be delivered to a separate folder, immediately deleted, or otherwise processed according to specified rules.

Alternately, a mail server or other network node 135 may classify e-mail/communication 105 on behalf of the recipient, before the e-mail/communication is further communicated to the recipient's e-mail/communication application program, as discussed in more detail below.

In yet another embodiment, one or more "franking servers" may be utilized to provide franks 110, prioritize e-mails/communications 105 into separate service classes, and/or to categorize communications. Such categorization of e-mails/communications 105 may occur on behalf of individual recipients, groups of recipients, and so on. In this embodiment, the franking server may instruct the recipient's system 125 to properly classify and present franked e-mails. The franking server may also be configured to delete unfranked e-mails/communications 105, delay transmitting unfranked e-mails/communications (for example until all franked e-mails/communications have been transmitted and/or received), and/or to perform other operations as requested by recipients or others, such as server operators.

In yet a further embodiment, franked e-mails/communications 105 of a higher service class may be transmitted prior to franked e-mails/communications of a lower service class, which in turn, may be transmitted before unfranked communications. Still further, a franking system and/or any appropriately configured system (e.g., an ISP mail server, router, LAN device, and so on) may delay, for any given or desired amount of time, the transmission of e-mails/communications 105 franked in designated service classes and/or unfranked e-mails. This delay may further permit the recipient to receive and/or review higher category e-mails/communications 105 (that is, e-mails/communications 105 having a frank 110 corresponding to a high category service class) without the distraction of receiving lower category or unfranked e-mails.

In another embodiment, the franking server, network node 135 or other communications system, server, or switch may be configured to delay transmission of lower category e-mails/communications 105 until the recipient's e-mail/communication application program 130 indicates to the server that all franked e-mails/communications of a given or higher category have been received and presented to the recipient. It can be appreciated by those skilled in the art that the ability to filter, categorize, purge, prioritize, and/or delay certain communications, while expediting or processing others at a normal rate, may increase the efficiency of networked communication systems, such as the Internet, the World Wide Web, and others.

3. Filtering Embodiments

Figure 2A:
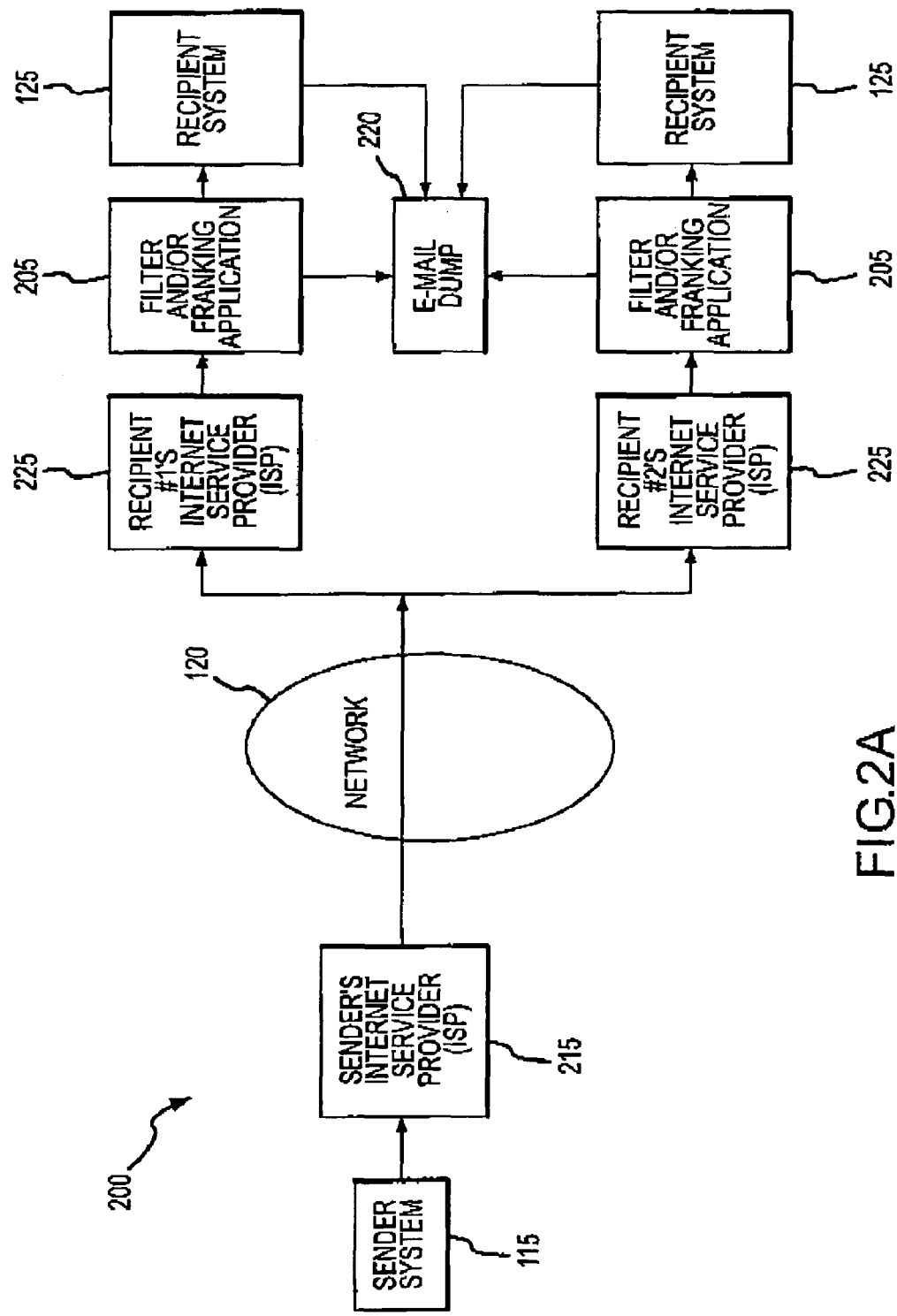
FIG. 2A displays an embodiment of the invention suitable for use with a filtering system.

One approach commonly advocated and sometimes implemented to control spam and/or other undesirable communications is to utilize filtering technologies. One embodiment 200 of a filtering approach is shown in FIG. 2A. In the filtering approach, which is commonly implemented by ISPs and/or corporate e-mail/communication systems, a "filter" 205 screens and eliminates unwanted e-mails/communications 105 received via a communications network 120 (such as the Internet or other networks). Such e-mails/communications 105 may originate from a sender's ISP 215, associated sender system 115, and/or communications devices, may be "spoofed" as if sent from another person or e-mail/communication address, or may arrive at the filter 205 via various other paths. Regardless of the source or path, e-mails/communications 105 that "pass" through the filter 205 are delivered to the recipient's system 125, while e-mails/communications that do not pass through the filter are generally discarded into an e-mail/communication "dump" 220. It should be noted that, although FIG. 2A displays a single dump, in actuality each ISP, network node 135, and/or recipient's device(s) may maintain one or more dumps for filtered e-mails/communications 105. Accordingly, the single dump 220 illustrated in FIG. 2A is simplified.

Further, e-mails/communications 105 placed in such dumps 220 may or may not be recoverable. In one embodiment, e-mails/communications 105 discarded into the dump 220 are not deleted/purged until a predefined event occurs (such as an indication from recipient to purge such e-mails/communications or a passing of a time). As such, discarded e-mails/communications 105 may be suitably retrieved by the filter 205 (i.e., the ISP's e-mail/communication server) and/or the by recipient's system 125 for presentation to the recipient.

In order to filter unwanted e-mails/communications 105 from legitimate communications, filters 205 commonly attempt to determine whether the domain from which a given e-mail/communication has been sent is on a "banned" list (i.e., a list of domains associated with persons or entities from whom a recipient, ISP or others do not desire to receive communications, for example, a listing of known spammers). If so, the filter 205 generally automatically rejects e-mails/communications 105 from such domain(s). However, spammers constantly change, "spoof," and/or hijack legitimate domains and/or senders' systems 115, addresses and devices, and/or mask the domain from which they send spam. Thus, a cat and mouse game often ensues between spammers and anti-spammers (i.e., those wishing to eliminate spam), in which the anti-spammers attempt to rely upon and/or utilize filtering techniques to eliminate spam.

Further, a major shortcoming of filters 205 and filtering systems is that they often have unintended consequences. As a filter becomes more specific in the content it does or does not allow to pass through, the filter may often reject undesired communications, such as spam, as well as legitimate communications. Additionally, filters 205 often do not reduce the volume of communications 105 received by any given ISP 225. Instead, filters 205 commonly reduce the volume of communications 105 communicated to a next node on a network and ultimately presented to a given recipient system 125.

One embodiment of the present invention uses aspects of the above described filtering processes in conjunction with frank 110 processing rules and systems to determine which communications 105 to present to a recipient. Using this embodiment, ISPs 225 or other network nodes 135 or entities (including recipients) do not need to (but, may still do so if desired) utilize filters 205 to analyze an e-mail/communication 105 and determine whether the sender, recipient, address, subject or content of the e-mail/communication is of such nature that it is acceptable to present to a given recipient or network node. Instead, the ISP 225 or other network node 135 processes e-mails/communications 105 in accordance with pre-defined or real-time defined franking rules and/or preferences. As is discussed in greater detail below, franks 110 may be attached or otherwise associated with given e-mails/communications 105. For example, in the case of streaming media, a frank 110 might exist for a given time period for a given stream of information from a specified source(s).

Rules may specify, for example, that only e-mails/communications 105 meeting specific franking requirements are presented to the recipient. Continuing the example, one such rule may provide that all unfranked e-mails/communications 105 are automatically discarded or rejected. Further, when a communication 105 is rejected, rules may provide for the transmission of a return e-mail/communication 105 indicating the reason for such rejection. Exemplary reasons include a lack of a frank 110, insufficient frank or the like. Similarly, rules may be developed such that e-mails/communications 105 that are not franked with a specific class of frank 110, or are not transmitted from a sender on an approved sender list (even if franked) are processed in accordance with other rules or procedures. Further, rules may provide that e-mails/communications 105 associated with a streaming media frank are processed first, in order to prevent jitter or other undesired interruptions in any e-mails/communications. It should also be appreciated that any rules and associated processing of e-mails/communications 105 may be handled by any ISP 225, server, intermediate network node 135, router, and so forth (collectively, "network node" 135) along the transmission path of the e-mail/communication 105, including the sender's ISP 215.

By separating the filtering of content (which may still occur in conjunction with the present invention) from the processing of franked/unfranked e-mails/communications 105 (which is accomplished in conjunction with the franking systems and processes of the present invention), it is anticipated that the need for advanced filtering criteria and complex filter designs, features, and functions may be reduced. Additionally, processing of e-mails/communications 105 based upon whether such e-mails/communications are associated with a frank 110 may also minimize the likelihood that legitimate e-mails/communications are accidentally permanently discarded. Thus, one embodiment of the present invention may utilize frank 110 processing rules and systems in conjunction with e-mail/communication 205 filters (and/or other known e-mail/communication processing devices) in order to determine when and whether to process and communicate e-mails/communications 105 to recipients.

Another approach for reducing and/or eliminating undesired communications 105, such as spam, utilizes recipient permissions and approved sender lists. In general, a permission-based software application (not shown), such as that provided by Choice Mail, may be loaded onto a recipient device or utilized at an ISP 225 associated with a given recipient device 125. In this approach, the application generally does not try to identify and block spam (see, for example, the Wall Street Journal article "Choice Mail Designs Best Traffic Cop Yet to Thwart Spammers," Jul. 11, 2002, incorporated herein by reference). Instead, the application determines whether a given sender has the recipient's permission to send the recipient an e-mail/communication 105. Upon belief, the Choice Mail system and similar approaches may utilize a look-up table containing a list of approved senders. The look-up table may be stored on the recipient's device 125 or at a network node 135. Accordingly, whenever an e-mail/communication 105 from an unapproved sender is received, permission is requested or verified from the recipient prior to the e-mail/communication entering the recipient's e-mail/communication inbox.

A derivation of this approach relies on providing one or more third parties (such as the recipient's corresponding ISP 225 or other network nodes 135) with a list of authorized senders. The ISP(s) 225 then filter e-mails/communications 105 based upon whether the communications are associated with a recipient's "approved sender list." As such, the task of prioritizing and/or categorizing is essentially shifted from the recipient to the ISP 225.

Figure 2B:
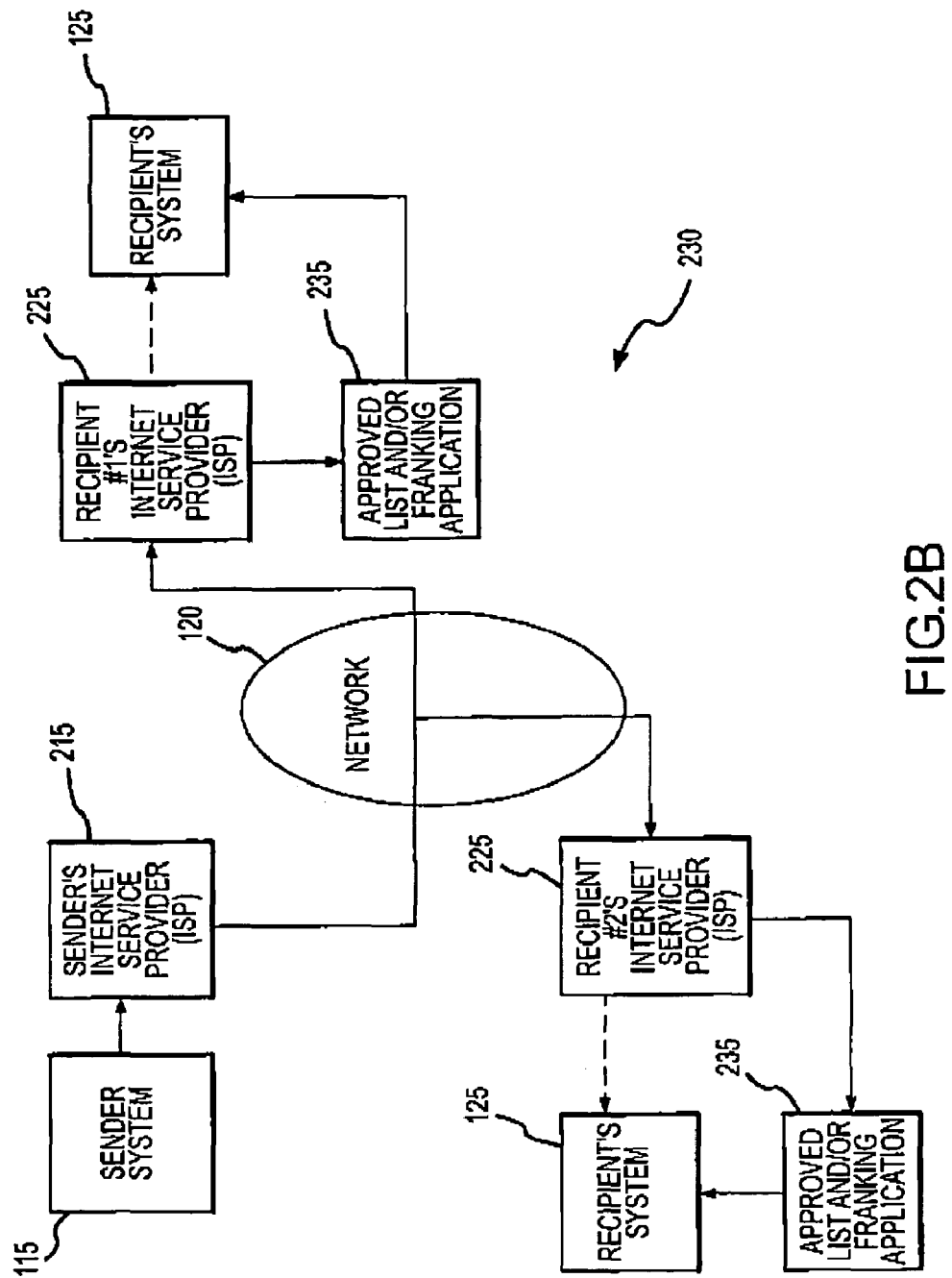
FIG. 2B displays a second embodiment of the present invention suitable for use with a filtering system.

As shown in FIG. 2B, various embodiments 230 of the present invention may incorporate approved sender lists 235 into the franking system, either at the recipient or network node 135 level. By implementing an approved sender list 235, a recipient may designate one or more senders whose e-mails/communications 105 are treated as if they were of the highest category even if the e-mails/communications are not franked or are franked in a lower category. For example, a sender may designate family members or friends as approved senders. E-mails/communications 105 from these entities are typically important to the recipient, even if the sender has not attached the importance of a paying for a verified frank 110. The approved sender list 235 may be stored at the recipient's system 125, at a portion of the network associated with the recipient (such as the recipient's e-mail/communication server or ISP 225), and/or at other network nodes 135. Accordingly, such e-mails/communications 105 may be treated by the general franking system and method described herein as a franked e-mail/communication, even if they are not associated with a frank 110. Such communications may be referred to herein as "pseudo-franked" communications.

However, it is to be appreciated that certain embodiments of the present invention may utilize a franking system wherein unfranked e-mails/communications 105 are automatically discarded. In such an embodiment, it is foreseeable that an unfranked e-mail/communication 105 from a sender on a given recipient's approved sender list 235 might be discarded before reaching the recipient's ISP 225 and/or device/system 125. As such, various embodiments of the present invention may also be configured such that approved sender lists 235 are communicated to clearing house servers (not shown). As used herein, "clearing house servers" generally remove an unfranked e-mail/communication 105 from a given network 120 unless the e-mail/communication is from an approved sender, as identified by a recipient's approved sender list 235. Currently, it is believed that most U.S. domestic Internet traffic passes through a handful of central servers. Such central servers may be configured to act as such clearing house servers. Similarly, large ISPs 215, 225 (such as America Online, MSN, Yahoo, and others) might also be suitably configured as clearing house servers.

Yet another embodiment may facilitate the communication of unfranked e-mails/communications 105 across a franked communications system or network 120. Accordingly, senders' systems 115 and/or associated servers 215 may be configured to store approved sender list 235 information. Using this embodiment, the sender's system 115, ISP 215, or other network node 135 may attach a pseudo-frank of no or little value (instead of a fully valued frank) when sending e-mails/communications 105 to a recipient who has previously identified the sender as being on his approved sender list 235. In this manner, systems designed to automatically discard unfranked e-mails/communications 105 may function without concern for approved senders' e-mails/communications being mistakenly discarded, because of the pseudo-frank value associated with such e-mails/communications. It is to be appreciated that, upon identifying a sender on an approved sender list 235 or removing a sender from such list, the recipient's system 125, ISP 225, or other network node 135 may send an e-mail/communication 105 to the sender's system 115 or ISP 215 which deactivates pseudo-franking for the given recipient. Thus, various embodiments of the franking systems and processes of the present invention may be utilized in conjunction with approved sender lists 235 and the like.

4. Central Server Embodiment

Figure 3:
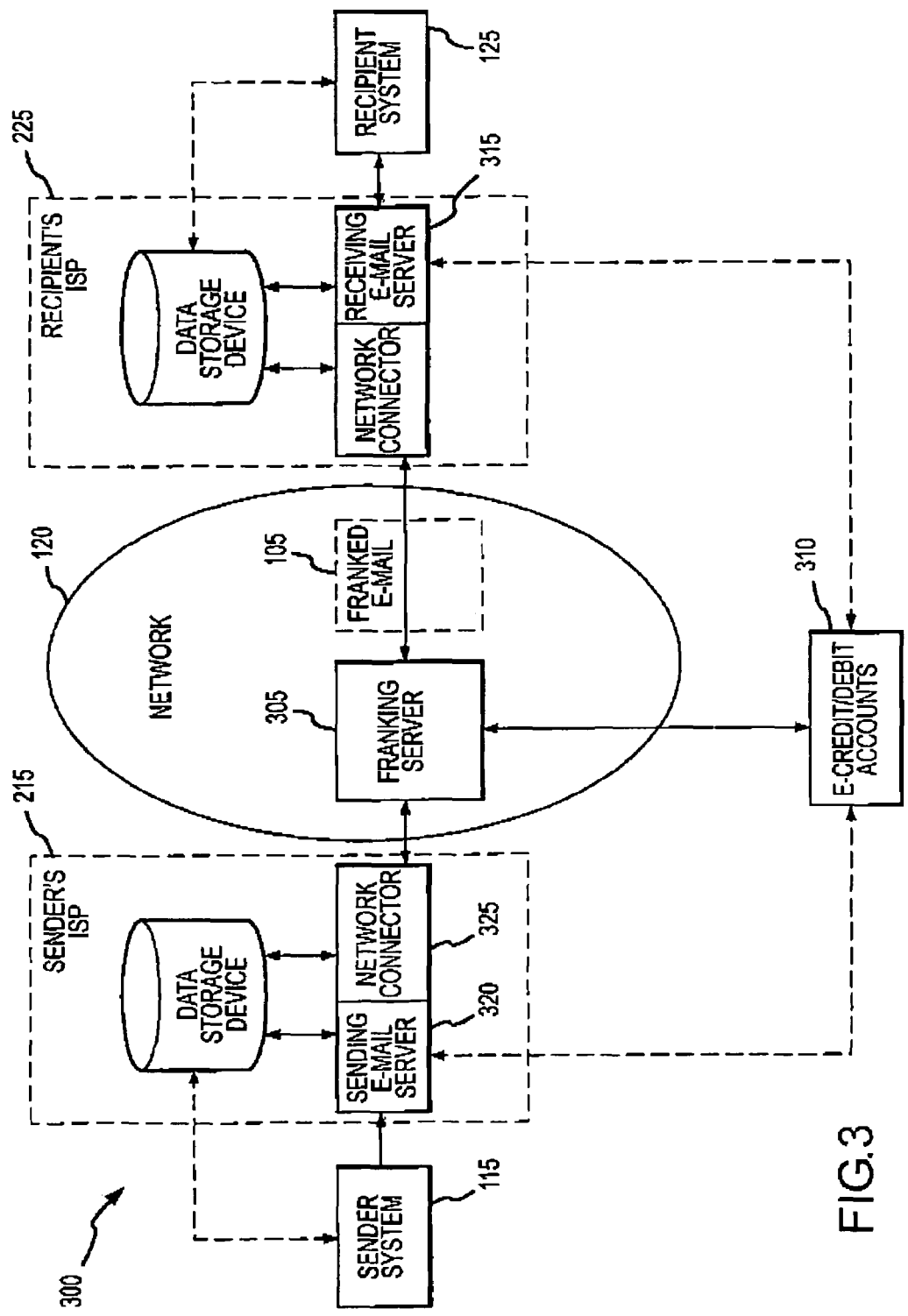
FIG. 3 displays a embodiment of a communications franking system in accordance with the present invention.

FIG. 3 shows an embodiment 300 of the present invention featuring a central franking server 305. Although only a single franking server 305 is shown in the embodiment of FIG. 3, in practice multiple franking servers may be employed. Each franking server 305 may, for example, be responsible for franking e-mails/communications provided by certain senders 115, network nodes 135, Internet service providers (ISPs) 215, 225 or their associated customers, geographical areas, network addresses, and so forth.

The sender's ISP 215 may include a sending e-mail server 320 and network connector 325. The network connector 325 may facilitate server 320 connection to the network 120.

Generally, in the present embodiment a sender may establish an electronic credit or debit account 310 with either the operator of the franking server 305 or a third party prepared to act as a payment intermediary between the sender and the franking server operator (for example, PayPal, Western Union and the like). These credit and debit accounts 310 may correspond to any association of "value" specified by the parties. Examples of such "value" may include monetary value (e.g., United States dollars), points or credits (such as frequent flyer miles), credit or a promise to pay at a later date, or any other negotiable, mutually acceptable items or measures. Similarly, the term "payment" as used herein generally refers to any such exchange of a mutually valued or accepted item. A sender (for example, a mass e-mailer or telemarketer) may use the account 310 to purchase or obtain franks 110 from the franking server 305. These franks 110 may be attached to, associated with, or incorporated into an e-mail/communication 105 or communication for transmission to a receiver.

It is to be appreciated that numerous techniques of attaching, associating or incorporating franks 110 with a communication 105 may be utilized in conjunction with the various embodiments of the present invention. For example, a frank 110 might be attached to a communication 105 by associating with the communication a separate packet of information identifying specifically franked packets. Also, a frank 110 might be associated with a communication 105 by appending necessary franking data to a packet or stream of packets (for example, as a header) while preserving encryption and other aspects of the underlying communication. Also, franks 110 may be incorporated into a communication by inserting digital watermarks or other indicators of franking directly into a communication 105.

Regardless of whether a frank 110 is already attached, associated with or incorporated into a communication 105, the sender may designate that certain communications are to be franked. Such designation may be contemporaneous (such as via a check box on a user interface prior to establishing or sending a communications), non-contemporaneous (for example, a preference list providing that all telephone calls to certain persons or regions are designated first class regardless of intended recipient), determined by a policy of a sender's organization, automatic, or otherwise. Further, the sender may specify and/or designate the service class for which each e-mail/communication 105 should be franked. Generally speaking, the higher the category of the service class, the more expensive the corresponding frank 110. E-mails/communications 105 for which the sender requests a frank 110 may then be transmitted (either physically or electronically) from the sender's system 115 across the network 120, or transmitted by another appropriate delivery means, to the franking server 305.

Upon receipt of the e-mail/communication 105, the franking server 305 determines the service class requested by the sender. The franking server 305 debits the sender's account 310 for the amount of the frank 110 (or simply confirms that the sender has pre-purchased a valid and legitimate frank of the appropriate class), attaches, associates or otherwise incorporates the frank 110 to the e-mail/communication 105, and transmits the now-franked e-mail/communication across the network 120 and to a recipient's e-mail/communication server 135. The recipient's e-mail/communication server 315 may verify the authenticity of the frank 110 and, once the frank's authenticity is confirmed, transmit the franked e-mail/communication 105 to the recipient's system 125. Additionally, where bulk franking of e-mails/communications 105 occurs, the franking server 305 may be provided with a single copy of an e-mail/communication having multiple recipients, and may frank and deliver the bulk e-mail/communication appropriately. Finally, the e-mail/communication application 130 resident on the recipient's system 125 may classify the incoming e-mail/communication 105 according to its frank 110. The above activities may be performed either for a single e-mail/communication or a number of communications.

In an alternate embodiment, the franking server 305 may receive a frank purchase request from a sender. This purchase request may or may not be tied to the transmission of a specific e-mail/communication 105 for which the sender desires a frank 110. Instead, for example, the sender may simply inform the franking server 305 (sometimes via a network-routed communication 105, but possibly through a direct network, Web-based, wireless, or other transmission) that the sender desires to purchase one or more franks 110. In response to the request, the franking server 305 may transmit the desired number of franks to the sender, who may then attach the franks to e-mails/communications 105 either immediately or at a later date. This process and procedure for purchasing franks from a franking server is described in more detail below with respect to FIG. 8.

In yet another embodiment, the franked e-mail/communication 105 may be transmitted via normal network 120 connections, bypassing the franking server 305 completely.

In such an embodiment, the franking server 305 primarily distributes franks 110 to senders, as mentioned above and discussed in more detail below.

In yet another embodiment, the franking server 305 may perform both frank 110 distribution and franked e-mail/communication 105 verification/transmission functions, but may also perform the functions in a manner unrelated to one another. That is, the franking server 305 may distribute franks 110 to senders as previously mentioned. The senders, in turn, may use these franks to frank an e-mail/communication 105, as desired. Once the sender franks the e-mail/communication, he may then transmit the e-mail/communication through the franking server 305, as also previously described. Accordingly, while the franking server handles e-mail/communication transmission and verification, and frank 110 distribution, these functions may be performed separately.

5. Operation of an Embodiment

Figure 4:
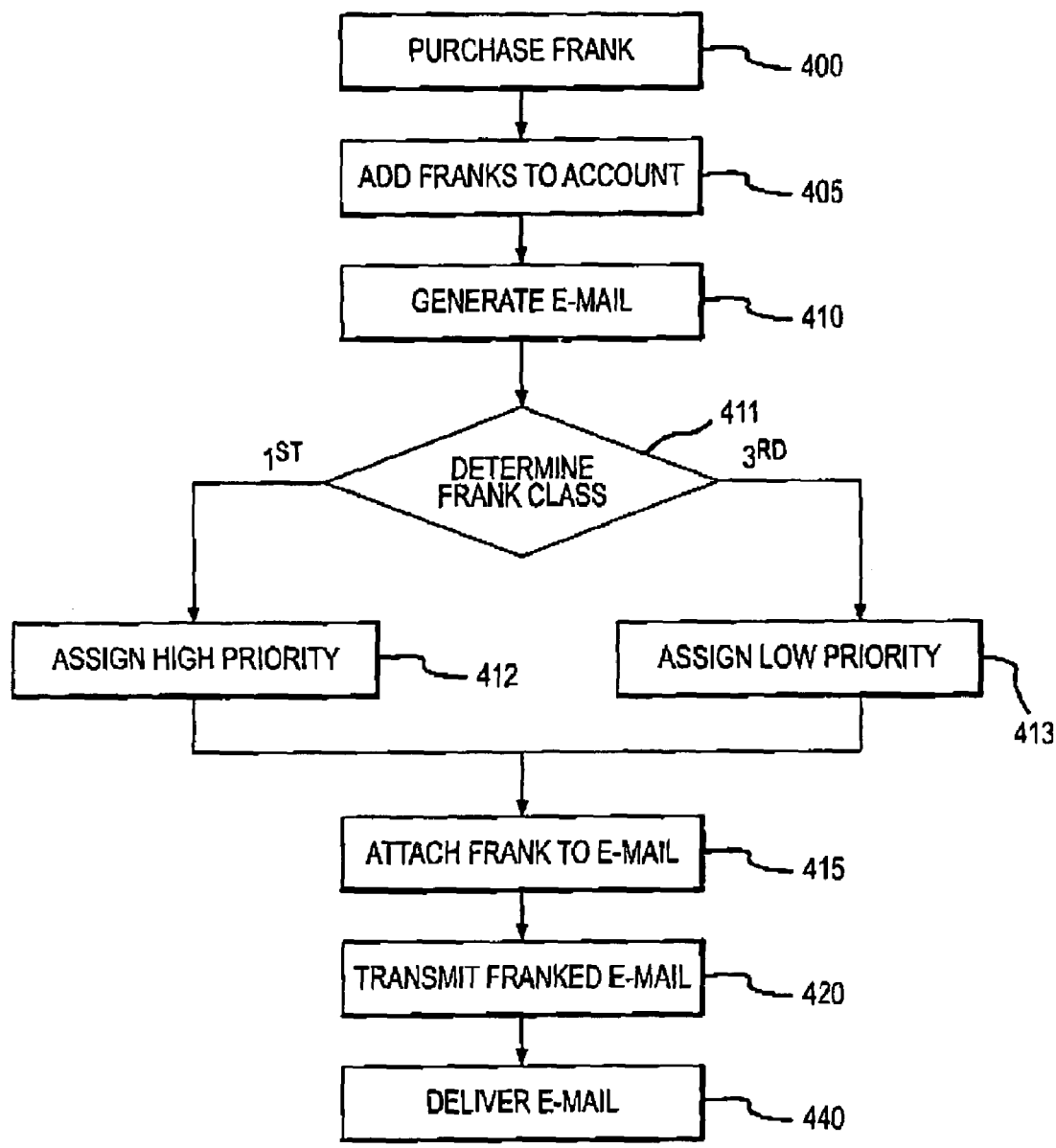
FIG. 4 displays a flowchart detailing the server-side operation of an embodiment of the invention.

The general operation of the embodiment 300 of FIG. 3 is shown in more detail in the flowchart of FIG. 4. The process begins in operation 400, in which the sender purchases or otherwise acquires one or more franks 105 from the franking server 305 or other device providing franks. Generally, as part of this purchase, the franking server 305 may deduct the cost of the franks from the sender's debit account 310, or may charge the cost of the franks to the sender's credit account. Where the cost of franks 110 are relatively small (for example, a few pennies or less), the franking server 305 may delay charging the sender's account until the total cost of purchased franks equals a minimum amount. As another option, charges to a sender's account 310 may be assessed for any value of franks, as determined by specific implementations of the present invention. The frank 110 purchasing procedure of operation 400 is explained in more detail below, in the section entitled "Frank Purchases." Alternately, the franking server 305 may not maintain accounts having a balance of franks for a sender's use, but may instead simply frank an e-mail/communication 105 upon request, for the appropriate fee. In such an embodiment, operation 405 may be omitted.

Alternately, franks 110 may be purchased from the server 305 and held at the server in an account associated with the purchaser. As communications 105 are received by the franking server, or as a purchaser requests, the franking server may debit franks 110 from purchaser's associated account and associate them with the communication or transmit them to the purchaser, as applicable.

Next, in operation 405, the purchased franks 110 are added to a sender's account. Generally speaking, the franking server may keep track of the number of franks currently associated with each sender. Such information could alternately be tracked by the sender's system 115. That is, a certain number of franks 110, value of franks, number of franks in a given category, and so forth may be downloaded to and metered by the sender's system 115, as described in more detail below.

Next, in operation 410, the sender identifies one or more e-mails/communications 105 for receipt by one or more recipients. Similarly, when communications other than e-mails/communications are to be established, such communications are suitably identified by the sender (for example, an IM session with a given recipient might be identified). As part of the e-mail/communication generation or origination process, the sender may designate the e-mails/communications 105 for franking. Further, the sender may designate what level of franking (as examples, first class, second class, third class, and so forth) the sender desires for each e-mail/communication 105. This designation may take the form of an encrypted code, an additional field on the e-mail/communication address, telephone number, or the like, an attachment, a "pretty good privacy" (PGP) key, a user specific identifier, and so forth. Alternately, the e-mail/communication may be generated before franks 110 are purchased.

In operation 411, the franking server 305 (or sender) may determine the frank 110 that should be assigned to the e-mail/communication 105. Different categories may be assigned to the e-mail/communication depending on the frank requested by the sender. For example, if the sender has requested and paid for a high category (continuing the above example, "first class") frank 110, the e-mail/communication 105 is assigned a high category in operation 412. If, however, the sender has requested and paid for a lower category (again in the example, a "third class" frank), e-mail/communication may be assigned a lower category in operation 413. Although only two frank 110 classes are shown here, namely, first and third, as a practical matter the embodiment 300 may have any number of frank classes. Once the proper category is determined, the frank 110 is attached to the e-mail/communication 105 in operation 415.

In operation 415, the desired frank 110 is "attached" to, otherwise associated with, or incorporated into the e-mail/communication 105. In the present embodiment, the frank 110 is attached to the e-mail/communication 105 upon receipt of the e-mail/communication by the franking server 305. Thus, the franking server is responsible for assigning the appropriate service class to each e-mail/communication, as requested by the sender. In alternate embodiments, the franking server 305 may be split into multiple network entities, one of which keeps track of a sender's account 310 balance and is responsible for selling franks 110 to a sender, and another network entity which actually integrates the frank with the e-mail/communication 105. In yet another embodiment, the e-mail/communication may be franked by the sender's system 115, the sender's e-mail/communication server 320, the sender's ISP 215, or another network node 135 associated with the sender. In any regard, once the e-mail/communication 105 has been franked, it is routed to the franking server 305 for transmission to the recipient's ISP 225 or e-mail/communication server 315 in operation 420. Finally, in step 440, the e-mail/communication is delivered.

In addition to the embodiments described herein, alternate embodiments may permit e-mails/communications 105 to bypass franking servers 305 and be transmitted across a standard network 120. In such cases, delivery and processing of the franked e-mail/communication 105 in accordance with the functionality or priority of the attached frank 110 may be handled by the recipient's ISP 225, mail server 315, mail application program 130, or any other network node 135 configured to recognize and process franks.

Figure 5:
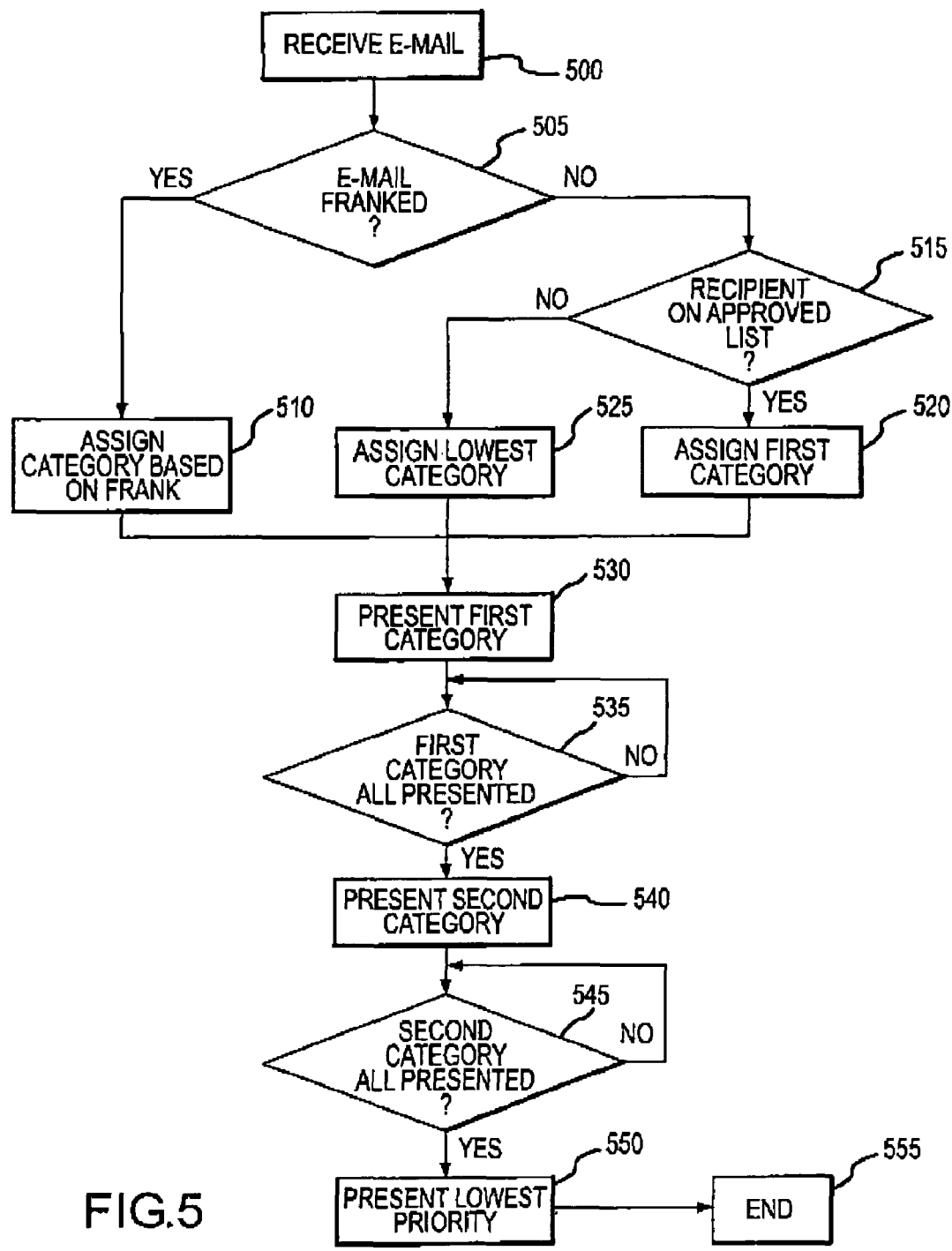
FIG. 5 displays a flowchart detailing the recipient-side operation of an embodiment of the invention.

FIG. 5 is a flowchart displaying one embodiment of a process undertaken by the receiving e-mail/communication server 315 upon receipt of a franked e-mail/communication 105. First, the process is triggered by receiving an e-mail/communication in operation 500.

In operation 505, the receiving e-mail/communication server 315 determines whether the e-mail/communication 105 has been franked. In the present embodiment, a network node 135 associated with the recipient determines the class of the incoming franked e-mail/communication 105. This network node 135 may be the recipient's system 125, the e-mail/communication application 130 resident on the recipient's system, the receiving e-mail/communication server 315, the recipient's ISP 225, and so on. Generally, all such network nodes 135 will be referred to herein as a "receiving e-mail/communication server." 315 Further, when a franked e-mail/communication 105 has been received by the receiving e-mail/communication server from the franking server 305, the frank 110 is presumed to be valid.

In an alternate embodiment, the receiving e-mail/communication server 315 may verify the authenticity of the frank 110 in addition to determining its class. For example, the receiving e-mail/communication server 315 may query the franking server 305, requesting identification of both the e-mail/communication 105 and the associated frank in order to ensure that the franking server issued or approves the frank 110. Such a query might consist of transmitting the encrypted frank itself plus a portion of the e-mail/communication address, such as a time, date, or network address associated with the e-mail/communication, or may comprise a unique key (generated by a random key generator) from some combination of e-mail/communication and frank data. In some embodiments, such as those for use with a telephone system (i.e., where the e-mail/communication in question is a telephone call instead of an electronic mail), the query may include a portion of the sender's telephone number.

If the e-mail/communication 105 is validly franked, in operation 510 the e-mail/communication is categorized according to the frank 110. Otherwise, in operation 515, the receiving e-mail/communication server 315 may optionally determine whether the sender is on a recipient's approved sender list 235. One example of an approved sender list 235 may be a recipient's e-mail/communication address book, while another may be an individually-constructed list.

If the receiving e-mail/communication server 315 determines in operation 515 that the sender is on the recipient's approved sender list 235, then the corresponding e-mail/communication 105 may be assigned to the highest possible or "first" category in operation 520 or otherwise processed, for example, in accordance with rules or preferences previously expressed or determined for the given recipient. If, however, the unfranked e-mail/communication 105 sender is not on the approved list 235, the e-mail/communication 105 may be assigned to the lowest category in operation 525 or otherwise processed. Although operations 515 through 525 describe a single approved list 235 implementing a binary classification system (that is, highest category or no category), alternate embodiments may employ multiple approved sender lists 235, an approved sender list with multiple classifications, or a combination thereof, each of which assigns a different category to an e-mail/communication 105 based on the sender. For example, one embodiment may have a "first category" approved sender list 235, on which a sender may designate his friends and family, such that e-mails/communications from friends and family are assigned to the highest category. The embodiment may also include a "second category" approved sender list. Continuing with this example, the recipient may designate co-workers or casual acquaintances on the second category list. E-mails/communications 105 from these senders might be treated identically to third class or lower category franked e-mails/communications or in accordance with other rules or preferences of the recipient.

Reply e-mails/communications 105 from a recipient (or any e-mail/communication to a sender from a recipient, or vice versa) may include a visible indication that the sender is on the recipient's approved list 235.

An alternate embodiment may add to the approved sender list 235 all senders to whom the recipient has replied or otherwise initiated a e-mail/communication 105 within a certain time period, such as six months or one year. Time periods may be set by the embodiment or the user. In the event the recipient does not transmit an e-mail/communication 105 to a sender within a time period, the sender may be removed from the recipient's approved list 235. Similarly, an alternate embodiment may add to an approved sender list those senders whose e-mails/communications have been accessed by a recipient within a certain time frame. Again, should the recipient not open or otherwise access the sender's e-mail/communication 105 after a certain time expires, that specific sender may be manually or automatically removed from the recipient's approved sender list 235.

In operation 530, the highest (or "first") category e-mail/communication 105 or e-mails/communications are presented to the recipient. This presentation may take many forms. For example, the headers of high category e-mails/communications may be displayed in the recipient's e-mail/communication application program 130. Alternately, one or more high category e-mails/communications 105 may be automatically opened and displayed to the recipient, either by the e-mail/communication application program 130 or in a separate pop-up box or window. As a further example, high priority e-mails/communications may be flagged with a certain color, so that the display of e-mail/communication headers is color coded. For example, all high-priority e-mails/communications 130 may be presented with red headers, while medium category e-mails/communications are presented with blue headers, and low category e-mails/communications are presented with green headers. In yet another embodiment, a specific tone or sound may be played when e-mails/communications of a certain category are presented, thus permitting a recipient away from his system to know when franked e-mails/communications are received and presented. Similarly, non-textual communications 105 may be similarly designated. For example, telephone calls from friends or family may be automatically directed to those devices 125 at which a recipient has an identified presence (such as an office phone or cell phone). Similarly, communications may be identified by distinctive sounds (such as rings), lights, actions taken by a recipient's device or the like. In an alternate embodiment, validly franked communications 105 may be automatically forwarded to a variety of devices 125, if not received or accessed through a first device. For example, devices may be ranked by priority, creating a list of device priorities. If the communication is not accessed within a certain time from the first device on the device priority list, it may be automatically forwarded to the second device on the device priority list, and so forth, until the communication is accessed.

In operation 535, the receiving e-mail/communication server 315 suitably determines whether all first category e-mails/communications 105 have been reviewed, processed, or otherwise acknowledged by the recipient or the recipient's system 125. If not, for at least one embodiment this check operation is repeated until such review is complete. For other embodiments, this operation may be repeated for a given number of cycles, for a given time period, until other communications are received or otherwise, or omitted entirely.

In operation 540, the receiving e-mail/communication server 315 presents all second category communications 105. Such presentation may occur after all first class e-mails/communications are presented, upon recipient request or otherwise.

In operation 545, the server 315 determines whether all second category e-mails/communications 105 have been reviewed or otherwise disposed. Again, this check may continue, depending upon specific embodiments, until all second category e-mails/communications are acknowledged or handled.

In operation 550, which preferably, but not necessarily, occurs after operation 545 returns an affirmative or "yes" determination, all e-mails/communications 105 lacking a category are presented.

Although FIG. 5 displays only the presentation of three categories of e-mail/communications 105, alternate embodiments may practically assign any number of classes, franks 110, or categories to e-mails. Further, the presentation and display of various e-mail/communication categories may take place in a number of ways. For example, e-mails/communications 105 may be sorted into different folders or in-boxes depending on their category. Alternately, e-mails/communications of a certain category or lower may be automatically deleted and never presented to a recipient.

Additionally, although FIG. 5 indicates a preference for presenting and reviewing e-mails/communications 105 of a higher category or service class before e-mails/communications of a lower category or service class are presented, alternate embodiments may simply display e-mails/communications of all selected categories simultaneously but sort the e-mails/communications in a display area according to category. That is, an embodiment 300 may place first category e-mails/communications 105 at the top of the recipient's in-box, second category e-mails/communications after the first category e-mails/communications, and so on and so forth. Accordingly, it should be understood that the determinative operations embodied by operations 535 and 545 are optional and need not be executed by all embodiments.

Once all e-mails/communications 105 have been presented to the recipient, the process ends in operation 555, and desirably automatically resumes operation 500 when the next e-mail/communication is received.

6. The Franking Application

Generally, franks 110 may be purchased by a franking application 600 resident on a sender's system. Further, the franking application may also append or otherwise integrate franks into a communication for transmission to a recipient. In alternate embodiments, franks may be appended to a communication by a franking server, as discussed elsewhere in this document.

Figure 6:
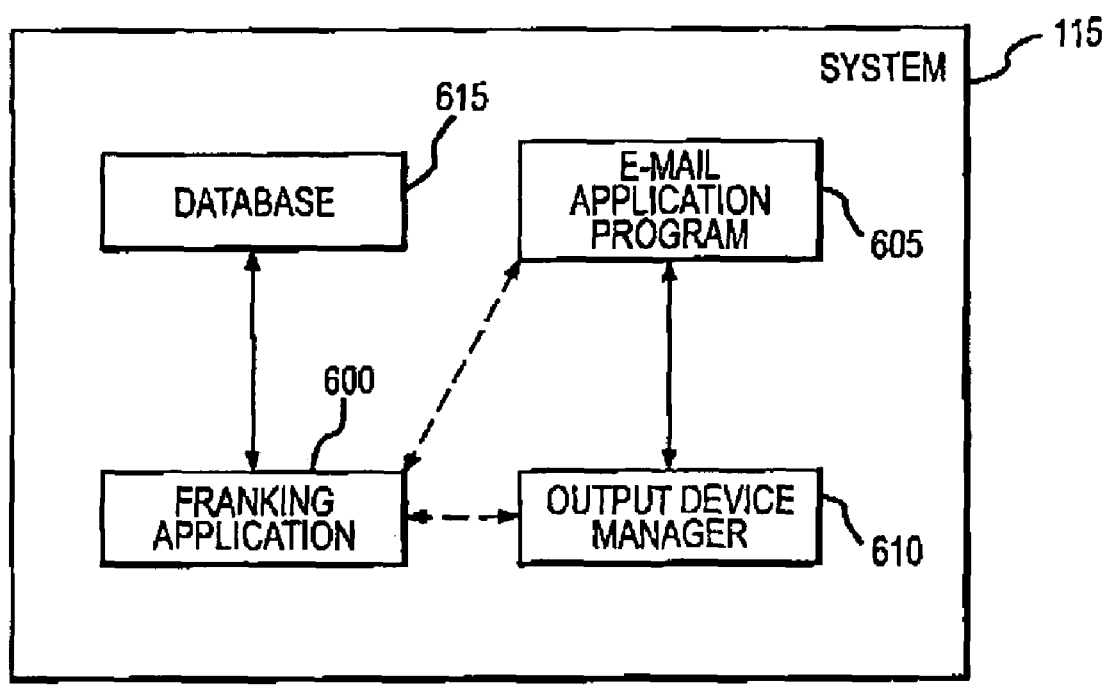
FIG. 6 displays a first embodiment of a franking application resident on a sender's system.

The franking application may take multiple forms. FIG. 6, for example, displays one embodiment of a franking application 600 resident on a sender's system 115 and employing an application program interface (API). In this embodiment, the franking application may interface with an e-mail/communication application program 605 (or other communications program) and/or an output device manager. The franking application may either directly interface with the output device manager 610, or may rely on the e-mails/communications application program 605 for such interfacing. These interface options are depicted as dashed lines on the figure. In alternate embodiments, the franking application may be implemented as a stand-alone program, part of another application, as part of an application suite, and so forth.

When a sender purchases or otherwise acquires franks 110 (as detailed generally with respect to FIG. 4 and more specifically in the section entitled "Purchasing Franks," below), the franking application 600 may transmit a request for franks to a franking server 305, typically remotely located. The request may be transmitted via the output device manager 610 or via the e-mail/communications application program 605.

For example, a sender may access the franking application 600 and specify a number and class of franks 110 desired, in addition to any special service qualities desired, such as certified or registered e-mail/communication. Certified and registered e-mail/communication franks are discussed in more detail below. The franking application 600 may include a graphical user interface (GUI), text interface, telephone or keypad interface, voice response or other appropriate interface for a user to input any needed and/or desired information. Further, the franking application 600 may request a source of payment or other exchange of value, such as an account number, credit card, and so forth. In alternate embodiments, the franking application may locally store a commonly-used payment source, or the sender may establish a credit or debit account 310 with the remote franking server 305 to be used for frank purchases. If such an account exists, the franking application 600 may simply instruct the franking server 305 to charge the sender's account 310 instead of specifying a different payment source.

Continuing with the example, the franking application 600 may generate a e-mail/communication 105 to be transmitted through the output device manager 610, across the network 120, and to the franking server 305, specifying the franks 110 desired and payment method. In response, the franking server 305 may verify both payment and the sender's identity, and transmit the desired franks 110 back to the franking application 600. Both transmissions may be encrypted for additional security, perhaps with an encryption code unique to each sender or franking server. The franking application may then verify the authenticity of the franks, for example by comparing an embedded authorization code against a separately transmitted key generated by the franking server. Alternately, the franking application 600 may generate the key as part of the frank request, and the franking server 305 may base the authorization code at least in part on the franking application's specified key. Once the franks' 110 authenticity has been verified, the franking application 600 may store the franks locally, for example in a database 615. In alternate embodiments, the franks' authenticity may not be verified, instead relying on the franking server 305 to confirm that the franks 110 are genuine when a franked e-mail/communication 105 is transmitted to (or through) the franking server.

In another embodiment, the above transmissions may occur through one or more e-mails/communications 105 initiated by the e-mail/communication application program 605 at the instruction of the franking application 600. The e-mail/communication may be encrypted, as above. Alternately, the franking server 305 may recognize only e-mail/communication frank requests including a specific word or phrase in the body or subject of the e-mail/communication 105. For example, each sender may specify a password and/or username when setting up an account 310 with the franking server 305. When the franking server receives an e-mail/communication having the proper password and/or username, it may process the frank request by debiting the account (or accepting a form of payment specified in the e-mail/communication) and transmitting the proper number and type of franks back to the franking application. This return transmission may be sent directly to the franking application 600 via the output device manager 610, or may take the form of a reply e-mail/communication 105 received by the e-mail/communication application program 605.

In an embodiment employing the e-mail/communication application program 605 as a means of transmission between the franking application 600 and franking server 305, the franking application may not be directly accessible by the sender. That is, the franking application 600 may operate below the GUI level of the operating system. It could, for example, take the form of an application or API accessible to the operating system and/or applications such as the e-mail/communication application program 605, but not include a dedicated user interface. Further, it is to be appreciated that the franking application 600 may be provided in other embodiments in other manners than as an API, and may be provided as a separate application program, web embodiment, interfaced directly with an e-mail/communication program, and the like.

Figure 7:
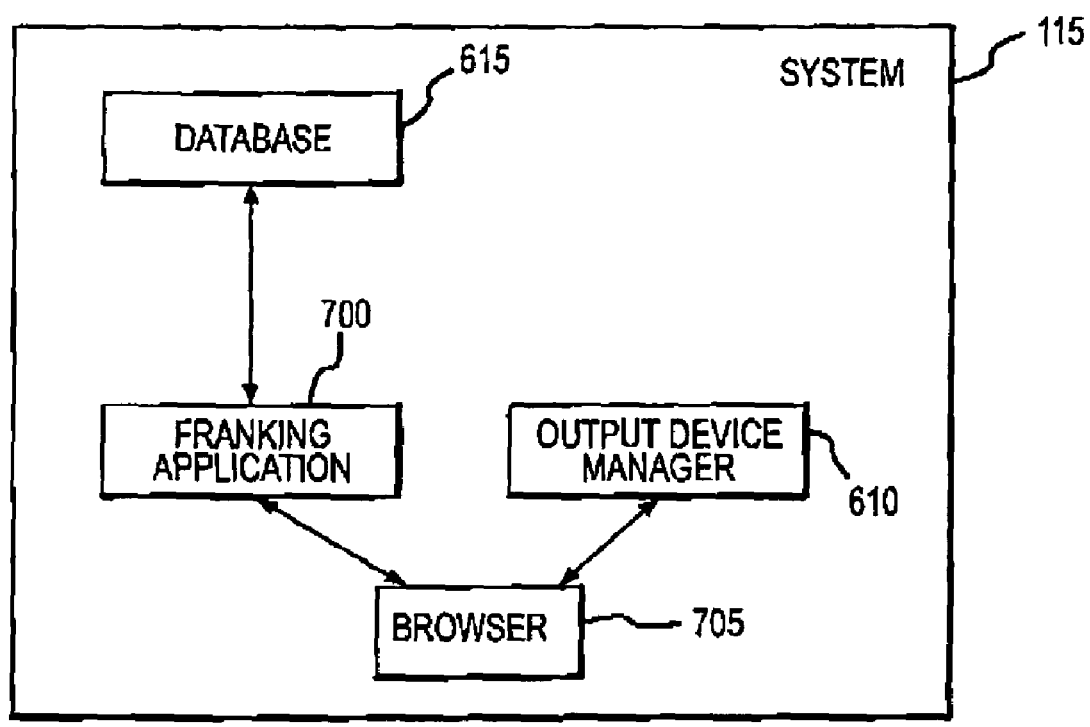
FIG. 7 displays a second embodiment of a franking application resident on a sender's system.

FIG. 7 displays a second version of a franking application 700, wherein the franking application 700 interfaces with a web browser 705 (such as, for example, those provided by Microsoft or Netscape). Here, the franking application 700 may again take the form of an API or application in communication with the browser 705. However, it may also be configured as a browser plug-in, JAVA script, ActiveX script, XHTML script, XML script, SGML script, VB script, HTML script or other such scripting language or protocol. Further, the franking application 700 may be remote to the sender's system 115 and accessible by the browser 705 through a network 120, and not resident on the sender's system at all. Thus, the franking application 700 may be a purely ASP-based solution which may be, for example, co-hosted with the franking server 305.

In a browser-based embodiment, general franking requests may be handled as described above. Further, in both embodiments, in addition to employing direct communication through an output device manager 610 or e-mail/communication based communication, the franking server may also transmit frank requests via, for example, hypertext transfer protocol (HTTP) compliant e-mails/communications 105 and/or other e-mail/communication formats. Similarly, the franking server 305 may respond with HTTP e-mails/communications or in other e-mail/communication formats.

Franks 110 may be purchased by a corporation, company, charity, or other entity, as well as by an individual. Accordingly, the aforementioned discussion embraces both possibilities. When a corporate entity purchases franks 110, however, it may keep all franks in a central "pool" or database to be distributed to company employees. Such distribution may be by periodic allocation or at an employee's request. Further, all employees may have direct access to the central frank database 615, or only certain approved employees may be able to access the database. Because the frank database 615 is electronic in nature, it may be easily accessed by employees, no matter where in the world the employee is physically located. Optionally, the database may only be accessed by those providing properly authenticated information, or who may pass other security measures, including biometric measures.

7. Purchasing Franks

Figure 8:
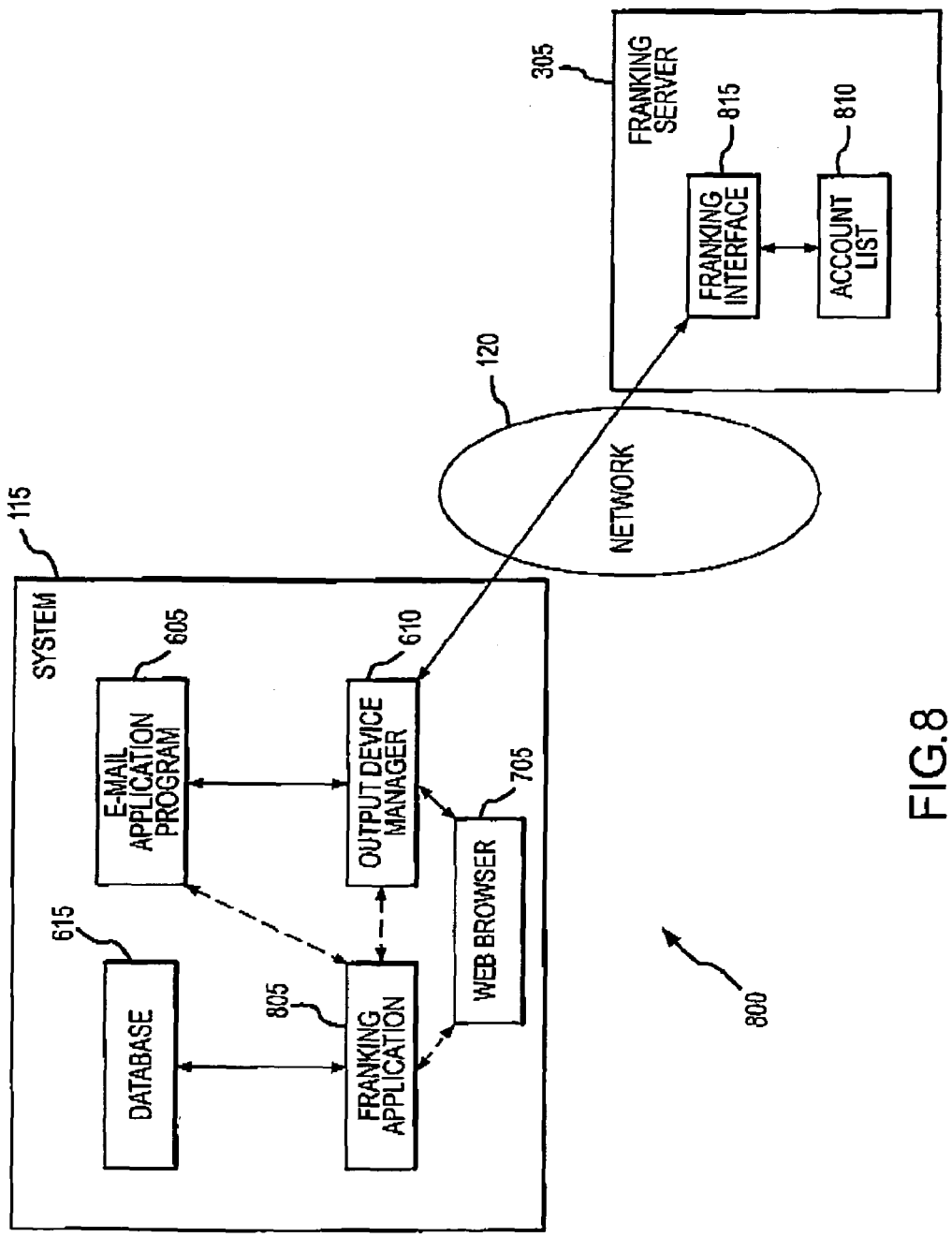
FIG. 8 displays a portion of an embodiment detailing the purchase of one or more franks.

FIG. 8 displays a portion of an embodiment 800 detailing the purchase of one or more franks 110. In the embodiment 800 shown in FIG. 8, the franking application 805 may interact with either a browser 705, an e-mail/communication application program 605, or directly with an output device manager 610, as represented by the dashed arrows. In alternate embodiments, the franking application 805 may interact with only one or two of the three other elements 605, 610, 705, or may be integrated as a sub-program in one or more of these elements. Further, although a database 615 is shown as a separate program or piece of code, it too may be directly integrated with the franking application 600, 700, 805, e-mail/communication application program 605, browser 705, or output device 610 manager.

Generally, a sender may initiate a frank 110 purchase through one of the variety of methods mentioned in the section above. As part of this initiation, the sender may specify one or more criteria for the frank 110. For example, the sender may specify a class of frank, frank value, number of franks desired, frank expiration date, frank encryption method, frank usage time (that is, time periods at which a frank may be valid—for example, from 6 am to 6 pm, or from 10 pm to 4 am, or any other start and end time), and so on. It should be noted that a frank usage time is different from a frank expiration date—the first specifies a period of time during a day, week, month, and so forth during which a frank may be attached to an e-mail/communication and accepted by a franking server, while the second specifies a time after which the frank will no longer be valid. Further, the frank expiration date may be specified as the end of a time period, or a certain date. For example, a frank 110 with a 1:00 p.m.–6:30 p.m. frank usage time and a three month frank expiration date may be used to frank an e-mail/communication 105 transmitted between 1:00 and 6:30 p.m. on any day during the three months after the purchase date. Additionally, the sender may specify a payment method, as discussed above.

Once a set of criteria is specified by the sender, a frank request is transmitted across the network 120 to the franking server 305. The frank request may be transmitted via the e-mail/communication application program 605, the browser 705, or the output device manager 610. Regardless, the frank request may be received by the franking server 305 through a franking interface 815. Once received, the franking server may debit the payment method specified by the user for the cost of the desired franks. Alternately, the franking server may maintain an account list 810 of approved senders that have either established credit or deposited funds with the franking server or a related entity. In such a case, the franking server 305 may instead simply debit the sender's account 310 for the cost of the franks 110.

Once payment has been verified by the franking server 305, the server may transmit the requested franks 110 to the sender's system. Such franks may be incorporated into an e-mail/communication 105 or web page, a designated HTTP transmission, or sent via any other file format recognizable by the sender's system. Generally, each frank 110 may be encrypted before transmission, and decrypted with a key accessible by the franking application 805. Each frank 110 may include several data fields, such as an expiration date, valid frank usage time, frank class, outbound encryption code, and so forth. The outbound encryption code may be used to encrypt either the frank 110, once used, or the franked e-mail/communication 105 itself.

The franking application 805 may store the received franks in a database 615 for later use. When a sender wishes to frank an e-mail/communication 105, the franking application 805 may retrieve a frank 110 having characteristics matching those necessary to frank the e-mail/communication 105 in the manner desired by the sender (i.e., having the class, expiration date, usage time, and so forth desired by the sender), and attach, embed, or otherwise encode the frank 110 to the e-mail/communication. Finally, the franking application 805 may delete the frank from the database 615.

In addition to purchasing franks 110 through any of the other methods described herein, franks may also be obtained through a stand-alone kiosk or other stand-alone dispenser, such as an automated teller machine (ATM) or telephone booth. For example, a purchaser may approach a kiosk, which may have a display screen and keyboard, and input specific details regarding the number and type of franks 110 desired (for example, five first class franks may be specified). After also providing a form of payment (such as swiping a credit card or inserting money), the kiosk may generate the franks 110 and provide them to the purchaser.

Alternately, the previously-mentioned card may contain data identifying a default set of franks 110, for example specifying a number of desired franks and classes or attributes for each. When the card is inserted into or swiped through the kiosk, the kiosk may automatically place the number and type of franks 110 specified by the data onto the card, and debit an account 310 associated with the purchaser. Yet alternately, the default frank set may be presented as a purchase option, rather than being automatically filled.

In addition to inserting a card or money into the kiosk, a purchaser may access a kiosk in a dataport. For example, the purchaser may connect a laptop to the kiosk via the dataport, and purchase and download franks 110 from the kiosk.

Such generated franks 110 may, for example, be transmitted across a network 120 to the purchaser's or another's account. In such an embodiment, the purchaser may specify an account (such as an e-mail account) to which the franks 110 are delivered to the kiosk. Upon receipt of the account information and payment, the kiosk may forward the franks 110 (for example, attached to, encrypted with, or embedded in an electronic e-mail/communication 105) to the account for later retrieval and use by the purchaser. Alternately, the franks 110 may be encoded as computer-readable data on a credit card, ATM card, smart card, magnetic disk, CD-ROM, or other form of magnetic or optical media, and later accessed and retrieved by a computer, for example via a magnetic card reader, magnetic or optical disc drive, infrared port, or other input device, or may be downloaded directly to a device.

Further, with respect to an embodiment employing an ATM to dispense franks 110, the ATM may encode the purchased franks onto the purchaser's ATM card when the card is inserted into the ATM machine and payment is authorized. Similarly, any embodiment may load franks 110 onto any credit card or other magnetic card used for payment authorization, substantially simultaneously with accepting the card for payment.

In yet another embodiment, a purchaser may purchase a set value of franks 110 pre-encoded on a card, magnetic or optical media, or other data storage device or memory (collectively, "card"), much in the manner of purchasing a pre-paid telephone calling card having a set number of calling minutes thereon. The card may be read by any appropriately-configured input device attached to any device or network node 135 capable of processing a frank 110. As franks are used, they may be deleted or otherwise removed from the card, thus decreasing the card's frank balance. Such cards may contain specific types and numbers of franks 110, or may contain a monetary value that may be exchanged for franks at a later date.

8. Multi-Server Embodiment

Figure 9A:
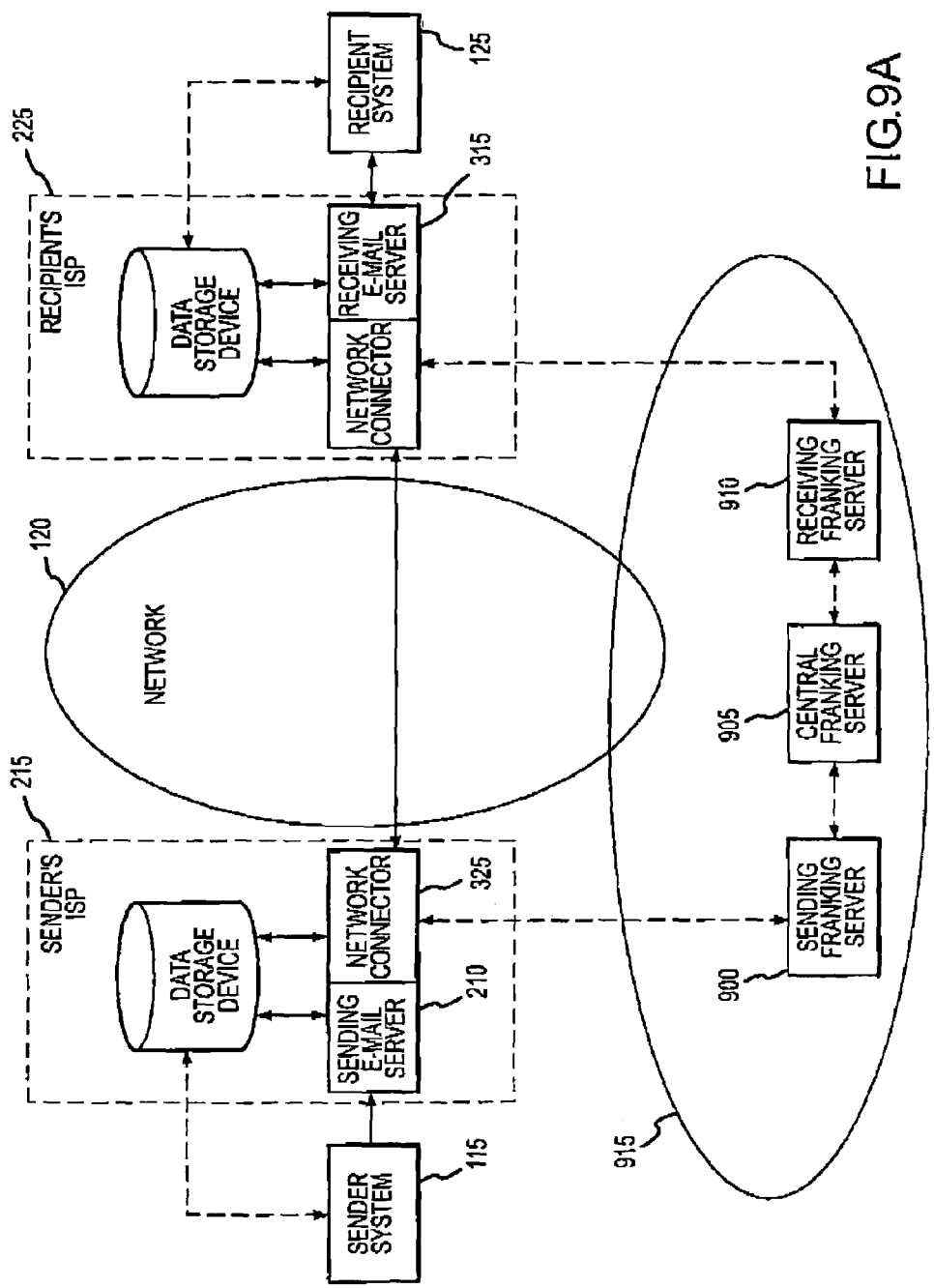
FIG. 9A displays a second embodiment of an e-mail/communication franking system in accordance with the present invention.
Figure 9B:
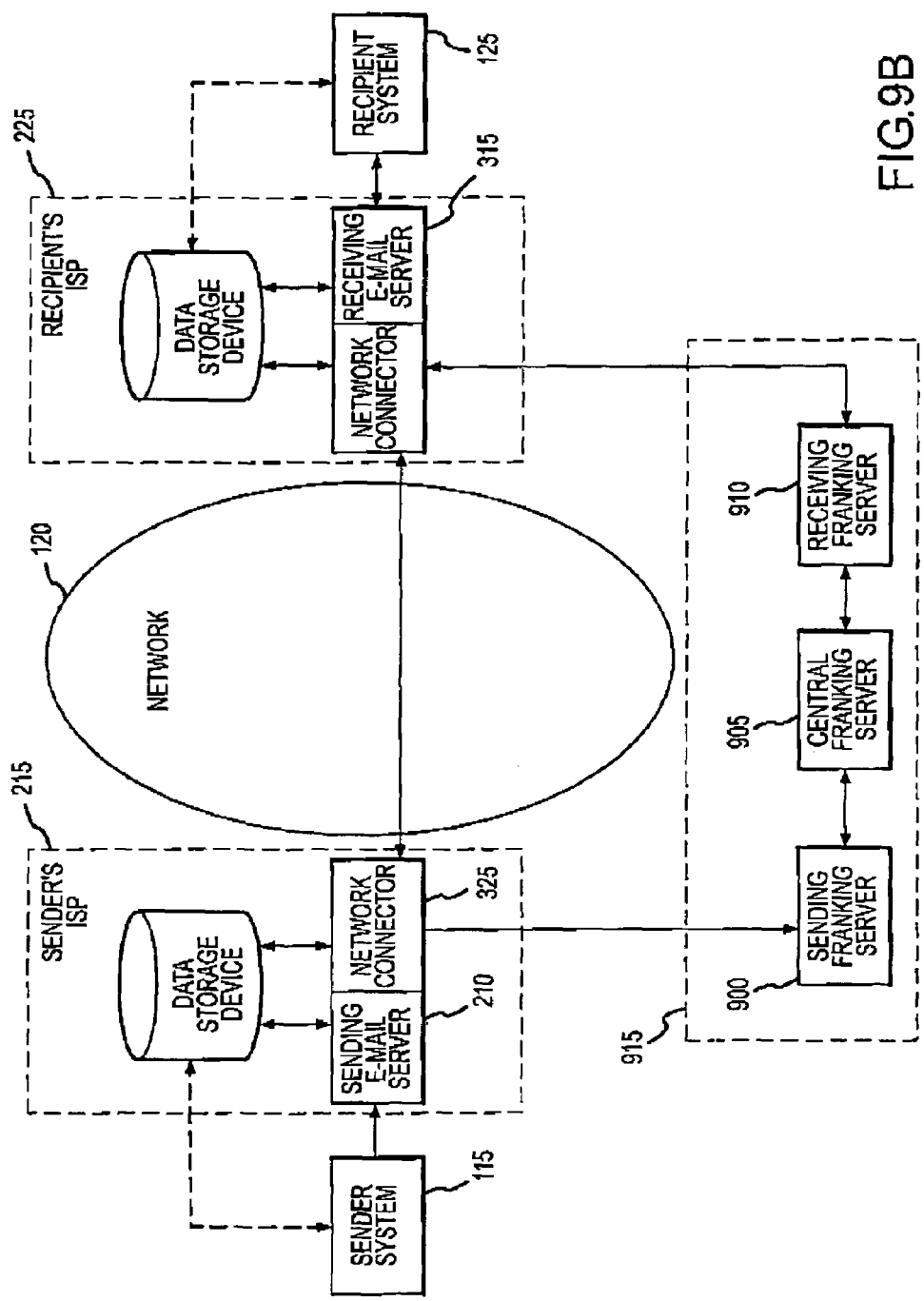
FIG. 9B displays a third embodiment of an e-mail/communication franking system in accordance with the present invention.

FIGS. 9A and 9B display embodiments of the present invention employing multiple franking system servers. Instead of the single franking server 305 shown in FIG. 3, three (or more, or fewer) franking servers may be interconnected.

In these embodiments, franked e-mails/communications 105 are transmitted across a specified franking system network. In FIG. 9A, the franking servers 900, 905, 910 are accessible through, and may communicate using, standard network 120 connections. In FIG. 9B, the franking server network 915 is not connected to the standard network 120, but instead is completely standalone. The embodiment shown in FIG. 9B may, for example, provide a more secure transmission path for sending a franked e-mail/communication 105. For example, registered, certified, or highly confidential military or governmental communications may employ such a system 915.

A sender may prepare an e-mail/communication 105 and purchase a frank 110 from the sending franking server 900. The sending franking server 900, in turn, receives the sender's e-mail/communication 105 from the sending e-mail/communication server 210 and incorporates the frank 110 into the e-mail/communication. Alternately, as previously described, the sending franking server 900 may split the franking distribution and e-mail/communication transmission functions into unrelated and/or separate operations.

Once franked, the sending franking server 900 transmits the e-mail/communication 105 across secured network connections to the central franking server 905. This may occur across a standard network 120, or the previously mentioned dedicated franking network 915. The central franking server 905 may comprise multiple franking servers responsible for relaying franked e-mail/communication 105 from a sending to a receiving franking server 910. By employing such servers 900, 905, 910, the risk of e-mail/communication interception is minimized.

The central franking server 905 delivers the franked e-mail/communication 105 to the receiving franking server 910, which may perform several functions. First, the receiving franking server 910 may verify the integrity and transmission path of the franked e-mail/communication 105. Because the receiving franking server may be part of the secured franking transmission system 915, it may be easily configured to verify that only approved network nodes 135 have handled the franked e-mail/communication. Second, the receiving franking server 910 may perform the categorization and display functions described above.

An alternate embodiment may include dedicated franking server networks 915 both within and without a network 120. Essentially, such an embodiment combines the dedicated franking server networks of FIGS. 9A and 9B. Further, such an embodiment may employ the secure out-of-standard network 120 franking network 915 to transmit only franked e-mails/communications 105 of certain categories, while other types of franked e-mails/communications employ the franking network connected to the standard network 120.

Additionally, where various franking networks 120, 915 are used, each franking network may be optimized for delivery of a different type of e-mail/communication 105. For example, a first franking network might be optimized to transmit franked e-mails/communications 105 consisting of text, while a second might be optimized to transmit franked e-mails/communications consisting of audio data or files, and a third optimized to transmit graphic e-mails/communications. In this manner, delivery of franked e-mails/communications 105 in certain categories may be expedited by fine-tuning networks 120, 915 to the transmission requirements of the e-mail/communication category.

9. Security Measures

Since the aforementioned embodiments may rely on the electronic exchange of value (including in some cases monetary funds) to provide value in the form of a franked e-mail/communication 105, unauthorized use of the system or server 900, 905, 910, 305 (collectively "system") may be of concern. In order to maintain integrity of the payment and franking system, "hackers" should be prevented from using the system without paying for a frank 110 or from otherwise interfering with value transfers. To this end, various and/or numerous protection schemes may be embraced by the various embodiments of the present invention.

A first protection scheme generally involves encrypting the frank 110, the e-mail/communication 105, or both. This encryption scheme may be analogous to the PGP scheme presently employed by many Internet sites and users. In this format, a franking system would act to certify an exchange of sender's and recipient's keys in order to allow for encryption and decoding of the frank 110 and/or the associated e-mail/communication 115. It is to be appreciated that, by using PGP encryption or a comparable encryption process, the franking system may be configured to certify each party's keys or encryption schemes. Utilizing such a security system may reduce the serving load on each of the franking systems, insofar as the franking systems may only need to exchange, certify, or authorize a sender's and recipient's public keys, rather than transmit entire e-mails/communications 105 from a sender to a recipient.

Alternately, franked e-mails/communications 105 may be authenticated by passing such franked e-mails/communications through a gatekeeper. One example of a gatekeeper system configuration is shown in FIG. 9A, where the central franking server 905 may act as a gatekeeper. In this configuration, Internet service providers 215/225 and/or independent franking nodes 135 may be utilized to approve and/or attach a frank 110 to an e-mail/communication 105. Requests for franks may be routed to one of these approved network entities 900, 905, 910. The network entities, in turn, would generate the frank 110 and attach it to the e-mails/communications 105.

Furthermore, the approved network entity 900, 905, 910 may attach an identifying code (analogous to a watermark on a traditional paper check) to each e-mail/communication 105 it franks. This digital watermark adds an additional layer of security because it permits a receiving e-mail/communication server 315 to identify the entity issuing the frank 110. This may be especially useful in an embodiment where the receiving e-mail/communication server 315 queries or otherwise attempts to verify the frank's authenticity with the issuing network entity.

Additional digital security measures used to maintain the integrity of network based communications, as known to those skilled in the art, may also be used with the various embodiments of the present invention.

10. Code-Based Franking

In addition to the franks 110 and various implementations of an address list 235 disclosed herein, an embodiment of the present invention may be configured to operate with a code, a password, or other identifier embedded or otherwise attached to the e-mail/communication 105. For example, one embodiment may be configured to automatically frank any outgoing e-mails/communications 105 including such a code, or to treat any incoming e-mails/communications containing such a code as a franked e-mail/communication. Effectively, the code may act as a frank 110 of any sort described (or any combination of franks described) herein, without requiring payment from the sender.

For example, a recipient may provide a code to a sender. Rather than franking an email/communication 105, as described herein, the sender may include the code in the body of the email/communication, its subject line, another portion of the email/communication, or otherwise attach or associate the code with the email/communication. Upon receipt of the email/communication 105 contained in the code, the recipient's ISP 225, or mail server 315, or mail application program 130 may verify the code. If the code is properly authenticated (for example, by comparing it against a list of recipient-specified codes or matching the code to a recipient's key), the recipient's ISP, mail server, or mail application program may deliver or otherwise queue the email/communication 105 as if the e-mail/communication were franked with a frank 110 of the type corresponding to the code. Alternately, the recipient's ISP 225, mail server 315, or mail application program 130 may generate a pseudo-frank of the type associated with the code and attach the pseudo-frank to the communication 105. By generating and attaching the pseudo-frank, the embodiment may facilitate processing the e-mail/communication 105 (including the code) according to the standard franking rules of the recipient's mail server 315, mail application program 130, or franking application 805, without requiring exceptions to those rules for e-mails/communications 105 having codes. Further, in an embodiment displaying the frank 110 type or class associated with the e-mail/communication 105 in a recipient's mailbox or folder structure, generating and attaching a pseudo-frank insures the embodiment displays the coded e-mail/communication in the same manner as any franked e-mail/communication received. Thus, visual continuity regarding the display of emails/communications 105 may be preserved by the embodiment.

The code is typically generated either directly by the recipient, in which case the recipient inputs or otherwise identifies the code to the embodiment, or by the embodiment itself. In the case of an embodiment-generated code, the embodiment may employ a number of different factors ("kernels") to generate the code. The kernel or combination of kernels (possibly along with a random number seed) facilitates creation of unique codes, thus minimizing repeating codes. Kernels may include, for example, the date and time at which the embodiment generates the code, the recipient's or sender's name, an alphanumeric string supplied by the recipient and/or sender, the frank 110 type to which the generated code will correspond, and so forth.

In yet another embodiment, the code may act to enhance the value or operation of a frank 110 attached to an e-mail/communication 105. For example, a recipient may specify a code that, when combined with a third class frank, instructs the recipient's ISP 225, mail server 315, or mail application program 130 to treat the third class frank as a first class frank. Similarly, code may add functionality such as registered mail, return receipts, and others discussed herein to a franked e-mail/communication 105 otherwise lacking such functionality. In this manner, a recipient may indicate some level of interest in the sender's e-mail/communication 105, thus enabling the sender to purchase a less expensive frank 110 which may nonetheless permit delivery of the e-mail/communication to the recipient. This may be useful, for example, when the recipient is interested in commercial mailings dealing with a specific subject. By transmitting this "value enhancing" code to the sender, the sender's marginal cost of e-mail/communication 105 transmission to the specific recipient may be lowered, but still present. Similarly, the value enhancing code insures some economic cost for transmission is incurred by the sender, in turn minimizing the likelihood the sender may misuse the code to transmit e-mails/communications 105 unrelated in content to the recipient's stated interest.

The embodiment may be configured to permit such codes to change in response to various criteria, thus eliminating the service life of a code and minimizing the likelihood of inappropriate use. For example, an embodiment may recognize a specific code only once, ignoring the presence of the code in any e-mails/communications 105 after the first.

Alternately, the code may be valid for a set period of time, a random period of time, a user's specified time period, and so on. The code could be encrypted either electronically or biometrically, as may the e-mail/communication to which the code is attached. Further, the code may specify to the recipient's ISP 225 (or other nodes 210, 215, 315 in the e-mail/communication 105 transmission path) that the e-mail/communication 105 should be transmitted from the sender to the recipient, rather than being purged or deleted. Codes may be unique to individuals, or may be shared by companies, organizations, ISPs, Internet domains, and so on.

11. Source Review of Franking

One embodiment of the present invention may also permit a sender's system 115, recipient's system 125, or other network node 135 to be configured to require evidence that an e-mail/communication 105 has been franked before the network node accepts, handles, transmits, or otherwise interacts with the email/communication. Further, the embodiment may store a list of known mass e-mailers, problem senders, or other senders at network nodes 135 so configured, and require evidence of franking only from senders on such a "trouble list." In yet another embodiment, entire domains may be placed on a trouble list.

In one embodiment, a trouble list may be compiled from recipient complaints. For example, any network node 135 receiving more than a certain number of complaints from one or more recipients about a specific sender may add the sender to the trouble list. Alternately, Any ISP 215, 225 or network node 135 that forwards, receives, or otherwise interacts with more than a certain number of copies of the same (or a substantially similar) e-mail/communication 105 sent to one or more recipient systems 125 may be added to a trouble list. The network node 135 may consider e-mails/communications 105 differing only slightly (for example, by time and/or date sent, or with minimal alphanumeric changes to the body, header or other information associated with the e-mail/communication) as multiple copies or multiple attempts at (in the case of telemarketers) of the same e-mail/communication.

In yet a further embodiment, network nodes 135 may add senders who transmit more than a certain number of substantially similar e-mails/communications 105 during a given time frame (for example, within one day, three days, forty-five minutes, and so forth) to a trouble list. In this manner, the network nodes 135 may add senders who time-delay mass e-mailings/communications to a trouble list.

In yet a further embodiment, the network node 135 may notify the sender (for example, via e-mail or other communication mediums) that he has been added to the trouble list. Alternately, the network node may notify the sender shortly before adding him to the trouble list.

Effectively, the above embodiments permit an ISP 215, 225 or other network node 135 to require e-mail/communication franking before such e-mails/communications 105 will be delivered or communications facilitated, in addition to allowing a recipient to require franking. Further, the network nodes may implement such franking rules as necessary.

12. Certified Mail Embodiment

In addition to the sorting, filtering, and valuation concepts discussed above, at least one embodiment of a franking system may be configured to provide additional unique enhancements to the transmission and receipt of e-mails/communications 105. For example, an electronic equivalent of certified postal mail may be implemented through an embodiment of the present invention. By requesting certified delivery of franked e-mails/communications 105, a sender may receive confirmation of the delivery of the e-mail/communication to the recipient. Generally, this confirmation is generated by either a franking application 805, 130 resident on the receiving e-mail/communication server 315, the receiving e-mail/communication application 130, a receiving system 125, or other network node 135 responsible for transmitting the franked e-mail/communication to the receiving e-mail/communication server. Some time after receipt of a certified franked e-mail/communication 105, one of the above may create a confirmation e-mail/communication indicating that the certified franked e-mail/communication has been received by the node 135. Optionally, the confirmation e-mail/communication 105 may include additional data, such as the time of receipt, whether or not the recipient has reviewed the certified franked e-mail/communication, an identifier corresponding to either the frank 110 or the certified franked e-mail/communication 105 itself, an identifier indicating the network or system element 135 generating the confirmation e-mail/communication, and so forth. Once created, the confirmation e-mail/communication may be transmitted across the network 120 to the sender's system.

Unlike the read receipts or delivery receipts currently generated by some e-mail/communication application programs 130, certified franked e-mail/communications may return a delivery confirmation. Present e-mail/communication application programs 130 typically only return such receipts if the recipient's e-mail/communication application program is able to understand the request generated by the sender's e-mail/communication application program. Due to the wide variety of e-mail/communication applications 130 in use, this is not always (or even often) guaranteed.

In the aforementioned embodiments, by contrast, franked e-mails/communications 105 may pass through at least one network node 135 equipped to identify and verify the franked email/communication. For example, this element may be a franking server 900, 905, 910 within the network 120, 915 itself, a receiving e-mail/communication server 315, or the recipient's system 125. Regardless, this enables some uniformity of formatting and programming within the franking system in order to accurately categorize franked emails/communications 105. This same uniformity ensures that the network node 135 responsible for identifying and categorizing the franked e-mail/communication may generate a return e-mail/communication to the sender confirming delivery of a certified franked emails/communications.

In accordance with the above embodiments, the act of requesting certification of a franked e-mail/communication 105 may add a fee to the cost of the franking itself. This is analogous to the United States Post Office's practice of charging additional fees or postage when sending physical certified mail. Further, this additional fee may be nominal, merely reflecting the additional network 120 and system resources required to generate and transmit the confirmation email/communication.

In addition to the delivery receipt function described above, the certified mail features of the franking systems described herein may include a tracing function. That is, when a franked e-mail/communication 105 is certified for delivery, its path through the network 120 from the sending e-mail/communication server 210 to the receiving e-mail/communication server 225 may be logged. Typically, this log takes the form of a series of network addresses. The log may also indicate whether an e-mail/communication 105 was copied or stored at a network node. Optionally, the copying and storage elements of the log may be available only if an additional frank 110 is purchased.

The log may be appended to the franked e-mail/communication 105 or may be stored on the franking server 900, 905, 910, 305 for remote access and viewing by either a sender or a recipient. In this manner, both the sender and recipient may trace the routing of the franked email/communication 105, thus permitting either party to know exactly which servers forwarded the email/communication. Should the e-mail/communication be intercepted or copied, the log provides a list of all possible sites at which such interception or copying may have occurred.

Further, and possibly for an additional fee, a "clean-up" function may be implemented for certified franked (or indeed any form of franked) email/communication 105. The clean-up function may instruct the franking server 900, 905, 910, 305 or another network node 135 to retrace the network path of the e-mail/communication, as defined by the aforementioned log, and delete any residual files that may be left behind on any of the nodes 135 in the e-mail/communication path. In this manner, the various embodiments described herein may enhance a franked e-mail's/communication's 105 security by ensuring that no copies of the franked email/communication, even if fragmentary, are left behind in the network 120. In one embodiment, this "clean-up" function may be restricted to acting upon franking servers 305, 900, 905, 910 and/or affiliated network nodes 135 consenting to the clean-up, and/or that meet a minimum level of security in the receipt and transmission of e-mails/communications 105 (collectively, "affiliated nodes"). Similarly, an embodiment may restrict the path of certified franked e-mail/communication 105 through the network 120 to only affiliated nodes 135. Further, where an e-mail/communication was backed up or otherwise copied and removed from a system, the "clean-up" function may detect such removal and indicate to a recipient, sender, or third party that such copying occurred, in addition to indicating whether or not the "clean-up" function was able to eliminate the copy. The sender, recipient or third party may also be alerted as to when, where, and/or to what particular type of medium the copy was made.

13. Registered Mail Embodiment

Just as the various embodiments of the present invention may facilitate certified franked emails/communications 105, so may they facilitate registered franked emails/communications. Registered franked e-mails/communications may add an additional level of security to a franked email/communication. When a sender requests that a franked e-mail/communication 105 be sent via registered delivery and pay the appropriate fee, the franking software resident on the sending e-mail/communication server 210 or the franking server 305, 900, 905, 910 itself may encrypt not only the frank 110, but the entire content of the e-mail/communication 105 in accordance with any encryption scheme well known to those skilled in the art. This encryption may be generated based on either a key or password provided by the sender or recipient (or combination thereof) as with PGP encryption, or may rely on non-public keys held by each sending e-mail/communication server 210. By implementing an encryption system employing private, e-mail/communication server specific keys, and matching this key to another key held only by the receiving e-mail/communication server, the franked e-mail/communication may be protected against inadvertent or deliberate interception and decoding by a third party in possession of the sender's public key.

Additionally, a registered franked e-mail/communication 105 may be decoded only when an intermediate franking server 305, 900, 905, 910 supplies a portion of a key. In this manner, both the sender and recipient are assured that the registered franked e-mail/communication 105 passed through at least one secure franking server during transmission. This enhances the authenticity of the frank 110 itself. The registered delivery features of the various embodiments described herein may be combined with the certification features described above to permit generation and delivery of registered, certified franked emails/communications 105. As with certification of franked emails/communications, registration of franked e-mail/communication may include payment of some additional fee or exchange of other value above and beyond the cost charged for the frank 110 itself.

14. Additional Frank Classes and Charges

Several frank 110 service classes have been discussed above, such as franks for registered, certified, first class, second class, and third class e-mails/communications. Additional franks 110 for additional e-mail/communication 105 handling categories may also be used with an embodiment.

For example, an embodiment may require a specific frank 110 for e-mails/communications 105 exceeding a size limit, typically measured in kilo- or megabytes. This "large mail" frank may be required in addition to another frank 110. Continuing the example, a fifteen megabyte e-mail/communication 105 may be franked as first class, but may also need to be franked as a "large mail" in order for the embodiment to process and transmit it. Unfranked large mails may be subject to delivery delays, or may be refused delivery altogether.

As another example, a first class or higher category e-mail/communication 105 may be forwarded to a plurality of additional recipients and/or to the first recipient if the first attempt failed and "bounced." Such forwards may occur, for example, without payment of additional franks by a forwarding recipient or sender. Alternately, such forwards may occur to N additional recipients, wherein N may be defined by the original sender, the recipient or otherwise. As such, it is to be appreciated that any given frank 110 may be associated with particular rules and procedures including, but not limited to, forwarding rules. Such rules may be specified by servers 305, 900, 905, 910, franking service providers, senders, recipients, or others, or otherwise specified.

An embodiment may permit a sender to frank an e-mail/communication 105 for priority or expedited delivery. Such franked e-mails/communications may be assigned high priorities in delivery queues and may, for example, be routed across particular servers 305, 900, 905, 910 or other network nodes 135 having faster or less latent network connections to one another.

Yet another embodiment might accept and/or distribute franks 110 that, when attached to an e-mail/communication 105, permit auto-forwarding of the e-mail/communication to a given number of e-mail/communication addresses or destinations. For example, an "auto-forward" franked e-mail/communication 105 might specify three e-mail/communication addresses, each with a different delivery priority. If the embodiment fails to deliver the e-mail/communication 105 to the first priority e-mail/communication address, it may forward it to the second priority e-mail/communication address. If delivery to that address also fails, transmission to the third priority e-mail/communication address may be attempted. Further, an auto-forward frank 110 may come in varying prices, each of which reflects a different number of e-mail/communication addresses to which delivery may be attempted.

A related frank type is a "multi-address" frank 110. A multi-address frank, when attached to an e-mail/communication 105, may frank the e-mail/communication for transmission to multiple e-mail/communication addresses instead of just one. In another embodiment, the "multi-address" frank 110 may frank e-mails/communications 105 only to those e-mail/communication addresses not appearing in a sender's approved list 235.

An embodiment may also levy additional charges against a franked e-mail/communication 105. For example, in order to eliminate the e-mailing of random addresses and reduce network 120 load accordingly, a sender may be charged for each franked e-mail/communication 105 sent to an undeliverable address. Conversely, a sender might pay for a frank 110 that returns a e-mail/communication 105 to the sender when the recipient's e-mail/communication address is invalid.

As yet another example, an embodiment may discount one or more types of franks 110 if the franks are purchased in bulk. When a number of franks 110 purchased exceeds a threshold, the price per frank may drop. Multiple thresholds may be established in order to provide different discount levels. Further, such discounts may be applied only when all franks 110 purchased are of the same class or category, or discounts may be given when a sufficient number of franks are purchased, regardless of the frank category.

In further embodiments, franks 110 may correspond to various degrees of time delay. For example, a first class frank may have no time delay associated with it, while a second class frank may have a small time delay, and so oil. Further, special franks 110 may be available to expedite processing of an e-mail/communication 105 in order to offset inherent or calculated network 120, 915 delivery delays.

For example, an "immediate delivery" frank 110 may be purchased by a sender. The "immediate purchase" frank may be combined with a second class frank in order to offset the time delay of the second frank. The cost of both franks 110 together may be less than the cost of a "first class" frank.

Alternately, franks 110 increasing a delivery delay may be purchased as well. Such franks may credit a sender's account, instead of debiting the account, to aid in offsetting the cost of a second frank associated with such a "delay frank."

Alternate franks 110 may incorporate additional security measures. For example, another type of frank may require a recipient to pass a biometric security test (such as a fingerprint or retinal scan) to open or receive the e-mail/communication.

Some embodiments may generate, accept, and/or recognize "temporal franks." For example, a sender may purchase a first class temporal frank 110 permitting him to send first class e-mails/communications 105 to a recipient for a limited period of time. Similarly, senders may purchase third class temporal franks, certified temporal franks, registered temporal franks incorporating some form of security discussed herein, and so on. Generally, all of the frank's 110 attributes expire when the temporal window expires. Thus, for example, in the case of a temporal frank having security features, the security feature of the frank 110 would expire at the end of the temporal window.

In addition to the various frank 110 types described herein, a single frank may have multiple functions. That is, rather than attaching both a first class frank and a certified frank to a single e-mail/communication 105 to transmit the e-mail/communication with certification functionality and to insure the recipient's system processes the e-mail/communication as a first class e-mail/communication, a single frank combining both types of functionality may be purchased and attached to the e-mail/communication. In short, any frank 110 type or functionality described herein may be combined with any other frank type or functionality in the form of a single frank.

15. Approved Domains

In addition to the concept of an approved sender list 235 discussed above, an embodiment of the present invention may implement an approved domain list. This may be especially useful, for example, where a system administrator wishes all electronic mails/communications 105 associated with a particular domain name to be treated as first class franked e-mails/communications without requiring such payment. Where many e-mails/communications 105 are exchanged between two companies or domains, this permits priority or category handling of such data.

Generally, it should be noted that an e-mail/communication 105 from an approved sender, domain, or even franked e-mails/communications received from a verified franking server 305, 900, 905, 910 may also be filtered or processed according to the standard rules of the receiving e-mail/communication server 315, the recipient system 125, or the recipient's e-mail/communication application program 130. That is, simply franking an e-mail/communication 105 or adding a domain or sender to an approved list 235 may not circumvent virus checking software and so forth.

16. Payment Methods

Generally, senders pay for franks 110 on a per frank basis from either a credit or a debit electronic account. The franking server 305, 900, 905, 910 may withdraw funds directly from a sender's bank account, for example, provided that the sender authorizes such electronic withdrawal. Alternately, the sender may specify a credit card, a PayPal account, or other conventional third party electronic debit account for use with the franking system. In an alternate embodiment, the sender may establish a credit or debit account 310 directly with the franking system itself or an entity in fiscal partnership with the franking server.

Often, e-mails/communications 105 cost very little to transmit and receive. Accordingly, the general cost structure for a franking system as described herein is envisioned to be relatively inexpensive. It is to be appreciated, however, that more expensive systems may be used, as necessary, when information of greater importance, greater content, or in a certain format (e.g., audio file and video files) are communicated in such e-mails/communications 105.

For illustrative purposes only and not for purposes of construing or limiting any particular embodiment of the present invention, first class franking of an e-mail may cost on the order of 1¢ to 3¢ per frank. In contrast, first class franking of a legally file swapped audio recording may cost $2 to $3 per frank. Thus, for example, a mass e-mailer wishing to send out 100,000 first class franked e-mails/communications 105 might pay $1,000 for the privilege of having these e-mails/communications placed before each recipient with a high category. Further, second or third class franks 110 may be priced to cost commensurately less. For example, a third class frank or a third-class franked email might cost ⅕ to ⅒ the cost of a first class frank. With regards to audio files, second and third class franks 110 might not even be available. As such, it is to be appreciated that the cost of franks 110 may vary widely and may, but do not have to, be associated with assessments of the importance, content, medium or the like associated with a given e-mail/communication 105. Such assessments may be provided by the sender, servers or others.

17. Monetary Value Distribution Embodiments

In order to encourage network providers or ISPs 215, 225 to accept the franking system and to reimburse such entities for the time and effort required to classify franked e-mails/communications 105, the franking system may pay a portion of a monetary value of each franked e-mail/communication that passes through a network provider's e-mail/communication server to that network provider. In one embodiment, each network provider, or ISP 215, 225, that forwards or otherwise transmits a franked e-mail/communication may receive a portion of the frank 110 value from the franking system. In this embodiment, the revenue generated by each network provider may be relatively small (for example, on the order of $\frac{1}{10}$ to $\frac{1}{100}$ the value of the frank) due to the sheer number of e-mail/communication servers through which a franked e-mail/communication may pass while on its way to a recipient. Also, other values may also be suitably utilized as particular embodiments so specify to reward ISPs 215, 225 and others for processing and utilizing an embodiment of the herein-described franking system.

In another embodiment, only the network provider or ISP 215, 225 operating the receiving e-mail/communication server 210,315 is reimbursed. This encourages each ISP to adopt an embodiment of the franking system described herein by providing a financial incentive for implementing such a system. Under this payment scheme, each network provider 215, 225 operating a receiving e-mail/communication server 210, 315 may receive a proportionately greater share of the frank 110 value since it must be shared with only one network provider.

Similarly, this concept may be extended to end recipients. Each recipient that receives and/or opens or otherwise accesses a franked e-mail/communication 105 may be credited with a portion of the frank's 110 value in the recipient's own credit or debit account 305. A recipient's bank account or credit card account are examples of such credit and/or debit accounts. Other types of accounts include point systems (such as an account accruing "points" or value redeemable for goods or services once a certain point value has been reached), frequent flyer accounts, and the like. It is anticipated that such an embodiment offers several attractive features. First, it may provide each recipient with a small reimbursement, thus offsetting to some extent the cost of the time and effort that may be required to deal with lower-class or unwanted franked e-mail/communication 105, such as mass e-mail/communication (commonly referred to as "spam"). Second, under such a system a recipient may actually designate himself with his ISP 225 or network provider as a person interested in receiving large quantities of franked e-mails/communications 105. Where mass e-mailers use a lower category or lower class frank 110 for their e-mails/communications, this may be especially useful in that it permits an ISP 215, 225 to identify those recipients most likely to examine the e-mail/communication. The recipient benefits in that, for each such low category franked e-mail/communication 105 reviewed, he or she receives a small payment. The ISP 215, 225 benefits because it may sell the recipient's e-mail/communication address to mass e-mailers who wish to invest in low category e-mail/communication franking. Effectively, this permits the ISPs to assist mass e-mailers in targeting recipients likely to pay attention to the spam e-mail/communication 105. Mass e-mailers benefit by placing their e-mails/communications in front of recipients who are more likely than not to actually pay attention to the e-mails/communications' contents.

Other revenue-sharing models exist, in addition to those already described. For example, so-called "Internet cafes" are commonly used to access, send, and receive e-mails/communications 105 by people who do not own their own (or otherwise lack access to a) computer or other device. Kiosks or other devices or systems, as described above, may be placed in Internet cafes to dispense franks 110 or cards having digitally-encoded franks thereon to a purchaser.

Alternately, a purchaser may purchase franks 110 through any of the methods described herein while at an Internet café. The Internet café manager or owner may apply a surcharge for franks 110 purchased on one of the café's systems, or may maintain a communal account having a variety of franks therein. The communal account may be accessible by any sender employing one of the café's sending systems 115, with each sender paying a franking surcharge for each frank 110 taken from the communal account. Alternately, every user of any of the Internet café's systems 115 may be charged a flat or time-based surcharge for access to the communal account, whether or not franks 110 are withdrawn. A combination of the two surcharges (i.e., use-based and time-based/flat) may also be employed.

18. Communal Frank Pools

In some cases, it may be advantageous to provide a common pool of franks 110, accessible by multiple senders. The embodiment contemplates such a pool may be used, for example, in an Internet café, as described above. Companies, businesses, charities, non-profits, governmental entities, schools, and other organizations may also desire a communal frank pool. Such entities may also assign their own values for franks or specify such values.

Generally, a communal frank pool may include a number of franks 110, which may be of different types and varieties. Multiple users (typically defined by an access list) may access the pool and withdraw franks 110 therefrom, possibly subject to certain access restrictions. One or more users generally may replenish the access pool by purchasing franks 110 through by any of the methods described herein.

In some cases, corporate logos, mottos, names, or other identifiers may be affixed to franks 110 in the communal frank pool. For example, the embodiment may automatically affix a company name to a frank purchased by a company representative, or purchased using a company account. The company name may be displayed in an e-mail/communication 105 once a frank 110 is affixed thereto. In this manner, the origin of such communal franks 110 may be traced, uniformity of e-mails/communications 105 from a common source (i.e., the corporation or organization) may be maintained, and the purchasing organization may receive advertising benefits by using franks.

Similarly, franks 110 may be hidden (i.e., detectable only by computer/network systems) or visible. When visible, such franks 110 may be presented as icons, logos, pictures or otherwise.

19. Targeted Franked E-mail

Various methods exist for profiling an Internet user's interests. One such method is disclosed in U.S. Pat. No. 5,790,785, entitled "World Wide Web Registration Processing System," naming John R. Klug as inventor, and issued on Aug. 4, 1998, which is hereby incorporated by reference in its entirety (hereinafter referred to as "Klug"). The present franking system may be combined with this user profiling/registrar concept in order to provide a more cost effective means for franking mass e-mails/communications 105. By accessing various user profiles as taught by Klug, mass e-mailers may determine which recipients are most likely to review the contents of a spam e-mail/communication 105. In this manner, mass e-mailers may frank e-mails/communications going only to those recipients whose user profiles indicate that they would likely be interested in the e-mail/communication content. Not only does this permit the placement of advertising e-mails/communications 105 before recipients who may have one or more rules in place to treat such communications as franked in a high category due to interest, it ensures that those recipients are likely to actually treat the e-mail/communication as a high category document. Accordingly, the cost of franking e-mails/communications 105 to uninterested recipients may be reduced.

Further, where a franking system has been implemented including multiple service classes, mass e-mailers may employ the user profiling concepts of Klug to assign appropriate service classes and/or franks 110 to their e-mails/communications 105. For example, if one recipient's user profile indicates that he is highly likely to be interested in the mass e-mailing's contents, the sender may decide to frank an e-mail/communication 105 to that particular recipient as a second or third class franked e-mail/communication. By doing so, the sender has some assurance that the e-mail/communication 105 is, in fact, presented to the recipient with some category corresponding to the associated frank, relying on the recipient's inherent interest to open and review the e-mail/communication, but minimizing the franking cost by selecting a lower service class. On the other hand, if the sender transmits a mass e-mail/communication 105 to a recipient whose user profile indicates that he or she may be uninterested in the contents of the mass e-mail/communication, this disinterest may be offset by franking the e-mail/communication for a higher service class. That is, the sender may rely on a recipient's inherent desire to review the contents of a high category e-mail/communication 105 to offset the recipient's disinterest in the contents of the mass e-mail/communication.

Similarly, recipients may designate certain classes or types of e-mails/communications 105 to be received, regardless of whether these e-mails/communications are franked or not. For example, a recipient may designate all e-mails/communications 105 having certain words in the subject line (such as "advertisement," "automobile," or "diploma") as receivable, regardless of whether or not the e-mail/communication is franked. Further, the recipient may choose to receive all e-mails/communications corresponding to interests, classes, or products in which the recipient has previously registered an interest with the Klug user profiling/registrar system (or a like system). In this manner, a mass e-mailer/communicator may access registrar data from Klug, determine a recipient's areas of interests, and be assured that the recipient will receive the e-mail/communication 105, regardless of whether the e-mail/communication is franked.

20. Web-Based Embodiment

Generally speaking, the above embodiments have been described in the context of a sending 115 and receiving 125 e-mail/communication server. Such servers rely on both the sender's and recipient's systems running an e-mail/communication application program 600, 700, 805. However, in many cases, either senders or recipients are limited in their e-mail/communication 105 access. For example, many corporations place firewalls around corporate e-mail/communication servers 615, 225 in order to limit electronic mail access by their employees. Accordingly, the present invention also contemplates a Web based embodiment. A sender or recipient may access a dedicated Web site which enables them not only to send or receive electronic mail (such as web sites provided by Microsoft's HOTMAIL or Yahoo MAIL) and/or other forms of communications but also has inherent franking functionality. A sender may efficiently and easily frank any and all e-mails/communications 105 sent from such a Web based embodiment. Similarly, a recipient accessing this embodiment may be assured that, unlike an e-mail/communication application 130 resident behind a firewall, the Web based server will properly filter and categorize all franked communications 105.

In particular, it is to be appreciated that a Web based e-mail/communication system embodiment generally will rely upon HTML, XML, Flash, Java or similarly formatted web pages to provide the desired e-mail/communication functionalities. In particular, e-mails/communications 105 between a sender and a recipient commonly are first converted from a sender's e-mail format or other communications format into one supported by a recipient's communications service (as provided by an ISP) and Web browser. Such formats commonly include HTML and the like. By associating franks 110 with e-mails/communications 105, versus incorporating such franks within such e-mails/communications, determinations of which e-mails/communications to present to a recipient using a Web based communications system embodiment may be expedited by not having to convert the entire communication prior to processing a frank associated with the communication. Similarly, when Web based embodiments are utilized, e-mails/communications 105 and their associated franks 110 may provide for additional features and/or functions over those commonly supported by a mail exchange server embodiment.

21. Emergency Broadcast Service Embodiment

Another embodiment may be used to transmit emergency e-mails/communications 105 to a plurality of system recipients. For example, severe weather warnings, local emergencies, or even e-mails/communications 105 relating to national security may be quickly disseminated to a wide group of e-mail/communication recipients. Such emergency e-mails/communications may, for example, be franked with an "emergency" frank 110. Access to such emergency franks may be limited to an authorized list of users, or users from a specific Internet protocol or domain.

Such an embodiment may add additional, limited-access service classes for use only by designated individuals or agencies. Sample limited-access service classes include an Emergency Broadcast service class and a National Interest service class. By restricting access to these service classes, the present embodiment ensures that extremely important news bulletins or the like may be handled quickly and assigned a category above that of standard first-class or high-category franked e-mails/communications 105.

Essentially, when an authorized sender initiates an e-mail/communication 105 across the network 120, 915, and classified as one of these ultra-high categories, the e-mail/communication is specially franked and transmitted as above. However, instead of transmitting the franked e-mail/communication 105 to a single recipient or list of recipients, all (or a sub-set of) network nodes 135 and ISPs 215, 225 associated or in communication with the network 120, 915 may be configured to receive the franked e-mail/communication 105. Further, such nodes 135 may receive instructions to disseminate the franked e-mail/communication 105 to all registered system recipients.

Additionally, e-mails/communications 105 franked with such a service class may be specially designated to ignore filtering, checking, and virus software. Such an embodiment may be implemented by including a hard-coded filter command, one that cannot be changed by a recipient, instructing the receiving e-mail/communication server 315 to bypass all filtering or checking software. E-mail/communication software may be required to be compliant with such a system in order to ensure that emergency broadcast e-mails/communications 105 are immediately displayed on a recipient's system 125, regardless of what the recipient is doing when the e-mail/communication is received. For example, a dedicated window may be popped-up on a recipient's system 125 containing the e-mail/communication 105. Examples of possible e-mails/communications suitable for use with this embodiment and designated in an emergency category may include tornado warnings, terrorist attacks, sniper attacks, and so forth. For such e-mails/communications 105, the standard franking charges may be waived.

22. Telephony-Based Embodiment

Another embodiment of the present invention may be suitable for use in a voice telephony-based environment. This embodiment may, for example, be used by telemarketers to frank telemarketing calls. The embodiment may function across a land-line, cellular, IP, packet or other network topology. With respect to e-mails/communications 105 or other computer files transmitted across a network to a telephone or other end device, the above disclosure embraces such concepts.

Figure 10:
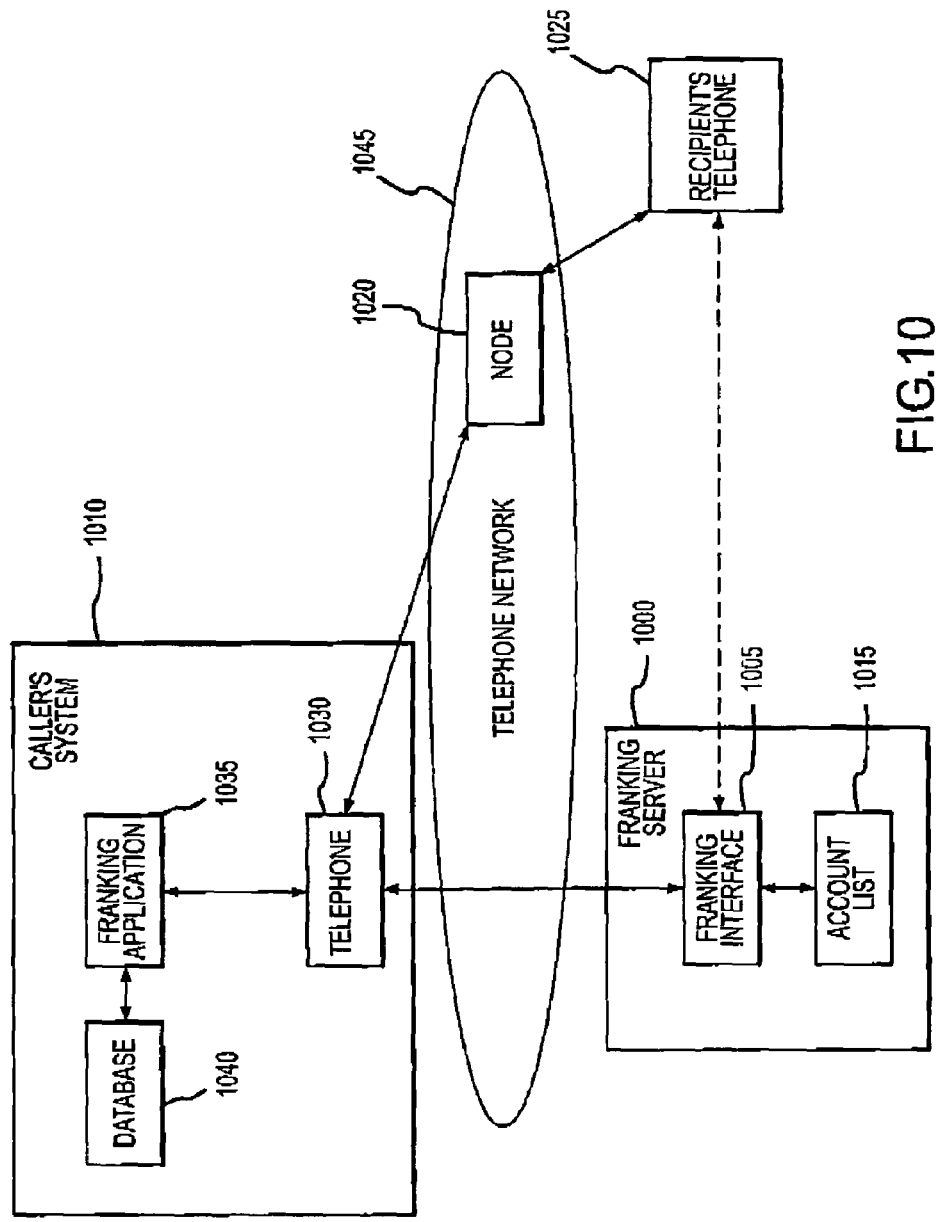
FIG. 10 displays an embodiment of the present invention suitable for use in a telephony-based environment.

With reference now to FIG. 10, a telemarketer or other caller may contact a franking server 1000 to purchase one or more franks 110 via his telephone 1030, as detailed with respect to FIGS. 6–8. The franking server 1000 may, for example, include a franking interface 1005 for handling a frank request initiated from a caller's system 1010, as well as distributing purchased franks. The franking server 1000 may also include an account list 1015 maintaining a list of all senders who have established an account 310 with the franking server. For reference, previously-discussed franking servers 305, 900, 905, 910 may also include these elements 1000, 1005.

The telemarketer may "attach" a frank 110 to his or her telephone call or other telephone communication 105. Generally, the frank may take the form of an electronic code recognized by a central office, router, or local switch, exchange, recipient's telephone equipment, or other telephone network node. Alternately, the frank 110 may be an audio tone preceding the telephone call 105. Different classes of franks may use different codes or tones. Further, different franks within the same class may also use different codes or tones, in order to incorporate data such as expiration dates and so on. The caller's system may include a franking application 1035 and/or database 1040, with functionality as generally discussed above with respect to other embodiments.

Once the franked call 105 is received by a network node 1020, the telephone network node may verify the frank's 110 authenticity. Generally, this verification may take place using any of the methods previously described. The telephone network node 1020 may then connect the call to the recipient's telephone 1025. The frank class and related information may be displayed on the recipient's caller identification equipment, telephone, or any other device connected to the telephone network 1045 and capable of displaying alphanumeric information or providing unique ring patterns.

Further, the recipient may configure his telephone 1025 or (generally through the telephone company as proxy) a network node 1020, such as an exchange or local switch, to reject all incoming calls that do not include a frank 110 of a given class or service type. In this manner, the recipient may use a frank to filter telephone calls. Additionally, the recipient may specify an approved caller list 235 of telephone numbers. Numbers appearing on this list 235 may always be presented to the recipient, regardless of whether or not calls originating from the number are franked.

23. Instant Messaging Embodiments

Generally, the above embodiments may also be applied in an instant messaging environment. Instant e-mails/communications 105 may be franked as desired by a sender, thus permitting a sender to indicate the relative importance of an e-mail/communication. Further, senders may purchase franks 110 permitting them to break into an otherwise private instant messaging session to deliver a suitably important e-mail/communication.

Generally, the handling, purchase, and transmission of franked instant e-mails/communications 105 is similar to that described above.

For example, one embodiment of the present invention may be integrated into or otherwise operate with an instant messaging application in order to frank incoming and outgoing instant e-mails/communications 105. A user of the instant messaging application may configure the stand-alone software or the IM application to only accept franked incoming instant e-mails/communications 125. Alternately, the embodiment may be configured with various address or sender lists 235 as described above, in order to allow the recipient to receive unfranked instant e-mails/communications 105 from senders on the designated sender list 235. With respect to an IM embodiment, the "sender" refers to the person initiating an instant e-mail/communication 105, while the "recipient" refers to the person receiving the e-mail/communication. Purchase of and information for IM franks 110 may be carried out in any of the manners described elsewhere herein.

Additional frank 110 types may prove useful in an IM environment. For example, one frank 110 may be valid for a specific length or period of time. For example, a sender may frank an instant e-mail/communication 105 with a temporal frank valid for a set period of time, such as fifteen minutes. Continuing the example, the recipient may configure the embodiment to accept such a temporally franked e-mail/communication. The frank 110 may effectively purchase a window of the recipient's time. From the first moment an instant e-mail/communication 105 bearing the temporal frank is received, the sender may have IM access to the recipient. After the time period specified by the temporal frank expires, the sender's instant messaging access to the recipient may be terminated.

This concept may be combined with any other type of frank 110. For example, a sender may purchase a first class temporal frank permitting him to send first class IM e-mails/communications 105 to a recipient for a limited period of time. Similarly, senders may purchase third class temporal franks, certified temporal franks, registered temporal franks incorporating some form of security discussed herein, and so on. Generally, all of the franks' 110 attributes expire when the temporal window expires. Thus, for example, in the case of a temporal frank having security features, the security feature of the frank would expire at the end of the temporal window.

Purchase and payment schemes for IM franks may be implemented in any manner discussed herein with respect to other types of franks 110. As yet another payment option, senders may be charged continuously or on a time basis for an IM frank. That is, the final cost of a frank 110 may be computed after an IM session is terminated, with the frank cost increasing with time of the session. For example, a first class frank may cover all instant e-mails/communications 105 sent by a sender to a recipient during an instant messaging session. Rather than purchasing a single frank 110 for each instant e-mail/communication 105 or a frank authenticating all e-mails/communications sent within a certain period of time, a sender may choose to purchase a frank having a cost increasing with the length of the IM session. For example, a first class frank 110 might cost three cents per minute regardless of the number of e-mails/communications 105 sent by the sender to a recipient. The frank 110 may be automatically renewed every minute until the sender affirmatively terminates or pays for the frank. Continuing the example, should the sender transmit five instant e-mails/communications 105 within a single minute to a recipient, he may be charged three cents for that period (presuming the sender terminates the IM session at the end of the minute). If, however, the sender requires a five minute IM session to send the same five e-mails/communications 105 to a recipient, the frank 110 cost may be fifteen cents. In yet another embodiment, a frank 110 cost may vary not with the duration of the IM session, but rather with the number of e-mails/communications 105 transmitted by the sender. Such a frank may more closely tie the frank cost to the transmission cost (i.e., bandwidth) of the IM session.

Additionally, any of the revenue sharing embodiments disclosed herein may be used with an IM session.

24. Short Message Service Embodiment

Another embodiment of the present invention may be utilized in conjunction with short message services ("SMS") and/or the short message service protocol ("SMP"). Any of the above features, embodiments and operations may be generally applied to an SMS environment. As is commonly appreciated, SMS/SMP enables a sender to communicate a short (commonly less than 160 alpha-numeric characters) message to a recipient's mobile or cellular telecommunications device. Similar to paging, SMS/SMP utilizes SMS centers ("SMSC") to communicate SMS formatted messages to a recipient. As such, in one embodiment of the present invention, the SMSC associated with a given recipient may be configured to identify, process, filter, discard and route SMS franked messages 105 to the recipient, upon establishment of a communications link between a recipient's device and a networked communications center, such as a home location register ("HLR"), wherein the HLR provides identification and routing information to a mobile or wireless communications device.

Further, in an SMS embodiment the frank 110 may be included in the 160 characters provided in an SMS message 105. Alternately and/or additionally, the frank(s) 110 may be suitably provided in a packet header, trailer, or the like and associated with a given SMS message 105. Further, the recipient's device may be configured to identify and appropriately process franked SMS messages 105. Such processing may also and/or alternately be accomplished by the SMSC, an HLR or any other node along a given communications path.

25. Franking and "Spoofed" E-mails/communications

One embodiment of the present invention may be configured to facilitate the sorting, distribution, and management of "spoofed" e-mails/communications 105. As used herein, the term "spoofed e-mail/communication" refers to an electronic e-mail/communication 105 (such as an e-mail/communication) that mimics or otherwise improperly uses another's identifying information, such as an Internet protocol ("IP") address. For example, a spammer may employ the e-mail/communication address of an intended recipient's trusted friend in order to disguise the commercial nature of his e-mail/communication 105. When e-mail/communication addresses 105 are hijacked or spoofed in this manner, many filters (and even people) cannot initially differentiate between legitimate e-mails/communications of interest and spam.

An embodiment of the present invention may differentiate spoofed e-mails/communications 105 from legitimate e-mails/communications in a number of ways. One method is by employing a variant of the address list 235 concept discussed above. The address list 235 may be set up not only to recognize certain e-mail/communication addresses, but also to associate a certain IP address with each e-mail/communication address on the list. This effectively implements a double filtering scheme: an e-mail/communication 105 must not only originate from an e-mail/communication address in the address list 235, but the corresponding IP address of the sender must match the IP address on file and corresponding to the approved sender's e-mail/communication 105 in the list. If both the e-mail/communication and IP addresses do not match those in the approved sender list, then the embodiment may reject the e-mail/communication 105, deliver the e-mail/communication to the recipient's inbox or mail queue if the e-mail/communication is properly franked, or otherwise manipulate the e-mail/communication in accordance with the functionality of the invention discussed herein and/or according to a user's wishes.

In an alternate embodiment, the approved sender list 235 may consist solely of a series of IP addresses rather than e-mail/communication addresses. Since e-mail/communication addresses are generally easier to spoof than IP addresses, this address list 235 implementation may minimize the acceptance of spoofed or otherwise illegitimate e-mails/communications 105.

Either of these address list 235 embodiments may be combined with any form or manner of franking described here. For example, a user may permit delivery of an unfranked e-mail/communication 105 by the embodiment if both the IP address and e-mail/communication address of the sender match entries on the address list 235. The user may require a relatively inexpensive frank 110 (such as the third class franks discussed above) if only one of the IP and e-mail/communication addresses match entries in the address list 235. Continuing the example, the user may permit delivery of an e-mail/communication 105 lacking either a matching IP or e-mail/communication address only when the e-mail/communication carries a relatively expensive frank 110, such as the first class frank described above.

It should be noted that many senders of e-mails/communications 105 across a network lack a constant IP address. Some senders are assigned a dynamic IP address every time a network is initially accessed. However, even for such senders, at least a portion of the IP address generally corresponds to the recipient's ISP or other service provider. Accordingly, one embodiment may be configured to correlate partial IP addresses with sender email addresses in order to account for so-called dynamic IP addresses.

26. Conclusion

While the present invention has been particularly shown and described with reference to various embodiments thereof, it will be understood by those skilled in the art that various other changes in the form and details may be made without departing from the spirit and scope of the present invention. Further, features of different embodiments detailed above may be easily combined with one another to form yet further embodiments. Accordingly, the proper scope of the invention is defined by the appended claims.

I claim:

1. A computer system for generating a frank, comprising:
a franking request receipt module, operative to receive a request for at least one frank; wherein the request associates at least one franking criterion indicative of the relative importance as specified by a user, with regard to a given communication;
wherein the franking request receipt module further comprises a communication receipt module operative to receive a communication and to determine whether the communication is franked or unfranked;
a franking generation module, operatively connected to the franking request receipt module, operative to generate a frank in response to the request for at least one frank and operatively connected to the franking request receipt module;
a franking attachment module operative to attach a generated frank to a received communication, the franking attachment module operatively connected to the communication receipt module and franking generation module;
a frank transmission module, operatively connected to the franking generation module, operative to transmit a generated frank, the frank transmission module operatively connected to the franking generation module;
whereupon transmission of the generated frank the frank is substantially contemporaneously attached to a communication or saved in a database for latter attachment to a communication; and
a verification module operative to verify the authenticity of a frank affixed to a franked communication, the verification module operatively connected to the communication receipt module and further operative to receive the communication from the communication receipt module.

2. The computer system of claim 1, wherein the franking generation module, and frank transmission module are co-located at a franking server.

3. The computer system of claim 1, further comprising:
a sender module, operatively connected to the franking request receipt module, the sender module comprising:
    a franking generation request module, the franking generation request module operative to generate the request for at least one frank; and
    a franking request transmission module operative to transmit the request for at least one frank and operatively connected to the franking generation request module.

4. The computer system of claim 3, further comprising:
a frank receipt module, operatively connected to the franking transmission module, operative to receive the generated frank from the frank transmission module;
a database for storing the generated frank, the database operatively connected to the frank receipt module; and
a frank attachment module operative to attach the generated frank to the communication, the frank attachment module operatively connected to the database.

5. The computer system of claim 1, further comprising a frank storage module, operatively connected to at least one of the franking generation module and the franking attachment module, and operative to store the frank requested by the franking request receipt module.

6. The computer system of claim 1, further comprising a sender system on which at least one of the franking request receipt module, franking generation module; franking attachment module, and franking transmission module reside.

7. The computer system of claim 1, further comprising a network node on which the franking attachment module, franking transmission module, and franking generation module reside.

8. The computer system of claim 1, wherein the communication receipt module further comprises:
a franked communication processing module operative to process the communication according to a first rule in the event the communication is franked.

9. The computer system of claim 8, further comprising a non-franked communication processing module, operatively connected to the communication receipt module, operative to process the communication according to a second rule in the event the communication is not franked.

10. The computer system of claim 9, further comprising a display module, operatively connected to at least one of the franked communication process module and the non-franked communication process module, operative to display the communication in a first state dictated by the first rule.

11. The computer system of claim 10, wherein the display module is further operative to display the communication in a second state dictated by the second rule.

12. The computer system of claim 9, wherein the communication receipt module, franked communication processing module, and non-franked communication processing module are incorporated into an electronic mail application.

13. The computer system of claim 9, wherein the communication receipt module, franked communication processing module, and non-franked communication processing module are co-located at a network node associated with an Internet service provider.

14. The computer system of claim 9, wherein the communication receipt module, franked communication processing module, and non-franked communication processing module are co-located at a recipient system.

15. The computer system of claim 9, wherein the communication receipt module, franked communication processing module, and non-franked communication processing module are co-located at a mail server.

* * * * *